United States Patent
Wang et al.

(10) Patent No.: US 10,790,942 B2
(45) Date of Patent: Sep. 29, 2020

(54) METHOD AND APPARATUS FOR FEEDING BACK HARQ-ACK INFORMATION

(71) Applicant: Samsung Electronics Co., Ltd., Gyeonggi-do (KR)

(72) Inventors: Yi Wang, Beijing (CN); Shichang Zhang, Beijing (CN); Yingyang Li, Beijing (CN)

(73) Assignee: Samsung Electronics Co., Ltd (KR)

( * ) Notice: Subject to any disclaimer, the term of this patent is extended or adjusted under 35 U.S.C. 154(b) by 44 days.

(21) Appl. No.: 16/089,925

(22) PCT Filed: Mar. 22, 2017

(86) PCT No.: PCT/KR2017/003079
§ 371 (c)(1),
(2) Date: Sep. 28, 2018

(87) PCT Pub. No.: WO2017/171299
PCT Pub. Date: Oct. 5, 2017

(65) Prior Publication Data
US 2019/0109677 A1    Apr. 11, 2019

(30) Foreign Application Priority Data

Apr. 1, 2016  (CN) .......................... 2016 1 0204744
May 5, 2016  (CN) .......................... 2016 1 0293521
May 6, 2016  (CN) .......................... 2016 1 0298403

(51) Int. Cl.
*H04L 1/18*    (2006.01)
*H04L 5/00*    (2006.01)
(Continued)

(52) U.S. Cl.
CPC ......... *H04L 1/1854* (2013.01); *H04B 7/0626* (2013.01); *H04L 1/1671* (2013.01);
(Continued)

(58) Field of Classification Search
CPC ... H04B 7/0626; H04L 1/1671; H04L 1/1819; H04L 1/1854; H04L 1/1861;
(Continued)

(56) References Cited

U.S. PATENT DOCUMENTS

2010/0067470 A1*  3/2010  Damnjanovic ....... H04L 5/0094
                                                     370/329
2011/0243066 A1   10/2011  Nayeb et al.
(Continued)

FOREIGN PATENT DOCUMENTS

CN    102904698    1/2013
CN    103580827    2/2014

OTHER PUBLICATIONS

PCT/ISA/210 Search Report issued on PCT/KR2017/003079 (pp. 5).
(Continued)

*Primary Examiner* — Minh Trang T Nguyen
(74) *Attorney, Agent, or Firm* — The Farrell Law Firm, P.C.

(57) ABSTRACT

The present disclosure provides a method for feeding back HARQ-ACK information. In the method provided by the present disclosure, a UE receives DL-GRANT scheduling downlink HARQ transmission in a time-frequency bundling window corresponding to respective uplink subframe for feeding back HARQ-ACK in turn, obtains a DL DAI in the DL-GRANT, and determines a mapping value of each DL DAI; then, maps bundling window corresponding to respective uplink subframe for feeding back the HARQ-ACK to corresponding bits of a feedback bit sequence according to the mapping value of the DL DAI; and transmits the HARQ-ACK on an available uplink carrier.

20 Claims, 15 Drawing Sheets

(51) Int. Cl.
  *H04L 5/14* (2006.01)
  *H04W 72/04* (2009.01)
  *H04B 7/06* (2006.01)
  *H04W 16/14* (2009.01)
  *H04L 1/16* (2006.01)

(52) U.S. Cl.
  CPC .......... *H04L 1/1819* (2013.01); *H04L 1/1861* (2013.01); *H04L 1/1896* (2013.01); *H04L 5/001* (2013.01); *H04L 5/0055* (2013.01); *H04L 5/0057* (2013.01); *H04L 5/0092* (2013.01); *H04L 5/1469* (2013.01); *H04W 16/14* (2013.01); *H04W 72/042* (2013.01); *H04W 72/0446* (2013.01); *H04W 72/0453* (2013.01); *H04L 5/14* (2013.01)

(58) Field of Classification Search
  CPC ..... H04L 1/1896; H04L 5/001; H04L 5/0055; H04L 5/0057; H04L 5/0092; H04L 5/14; H04L 5/1469; H04W 16/14; H04W 72/042; H04W 72/0446; H04W 72/0453
  See application file for complete search history.

(56) References Cited

U.S. PATENT DOCUMENTS

| | | | |
|---|---|---|---|
| 2013/0230033 A1 | 9/2013 | Lee et al. | |
| 2013/0322357 A1 | 12/2013 | He et al. | |
| 2014/0036818 A1 | 2/2014 | Koskela et al. | |
| 2014/0071932 A1 | 3/2014 | Fu et al. | |
| 2015/0063179 A1 | 3/2015 | Yang et al. | |
| 2015/0117271 A1* | 4/2015 | Liang | H04L 5/001 370/280 |
| 2015/0237619 A1 | 8/2015 | Yang et al. | |
| 2016/0212734 A1* | 7/2016 | He | H04L 5/14 |
| 2017/0170931 A1* | 6/2017 | Kusashima | H04L 1/1867 |
| 2017/0238287 A1* | 8/2017 | Kusashima | H04L 5/001 370/280 |
| 2018/0102892 A1 | 4/2018 | Lunttila et al. | |
| 2018/0278373 A1* | 9/2018 | Wang | H04L 1/1854 |

OTHER PUBLICATIONS

PCT/ISA/237 Written Opinion issued on PCT/KR2017/003079 (pp. 11).
PCT/ISA/210 Search Report issued on PCT/KR2016/010787 (pp. 3).
Samsung 3GPP TSG RAN WG1 #82, R1-154117, Beijing, China, Aug. 24-28, 2015, Discussion on HARQ-ACK codebook determination for eCA (pp. 6).
Qualcomm Incorporated 3GPP TSG RAN WG1 #82, R1-153856, Beijing, China, Aug. 24-28, 2015, HARQ-ACK feedback (pp. 5).
ZTE 3GPP TSG RAN WG1 Meeting #82, R1-154036, Beijing, China, Aug. 24-28, 2015, Adaptive HARQ-ACK codebook size determination (pp. 11).
ZTE 3GPP TSG RAN WG1 Meeting #82, R1-154048, Beijing, China, Aug. 24-28, 2015, UL framework for LAA (pp. 8).
Intel Corporation 3GPP TSG RAN WG1 NB-IoT Ad-Hoc Meeting #2, R1-161902, Sophia Antipolis, France, Mar. 22-24, 2016, UCI and DL HARQ-ACK feeback for NB-IoT (pp. 9).
Huawei HiSilicon 3GPP TSG RAN WG1 Meeting #84, R1-160747, St. Julian's, Malta, Feb. 15-19, 2016, ICT transmission for eLAA (pp. 4).
LG Electronics 3GPP TSG RAN1 #84, R1-160621, St. Julian's, Malta Feb. 15-19, 2016, Further details on uplink transmissions for NB-IoT (pp. 6).
U.S. Office Action dated Nov. 29, 2019 issued in counterpart U.S. Appl. No. 15/763,421, 32 pages.
Chinese Office Action dated Apr. 29, 2020 issued in counterpart application No. 201510621999.6, 25 pages.

* cited by examiner

[Fig. 1]
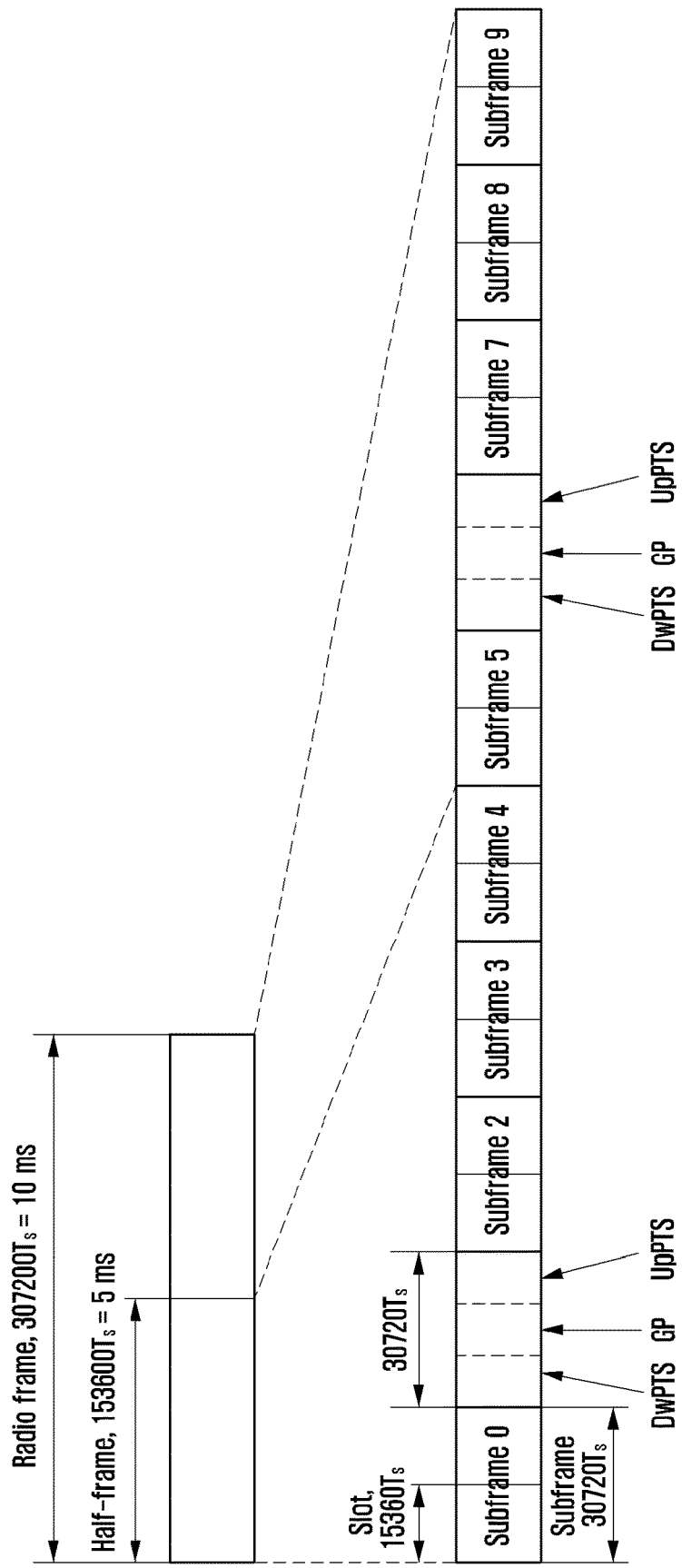

[Fig. 2]
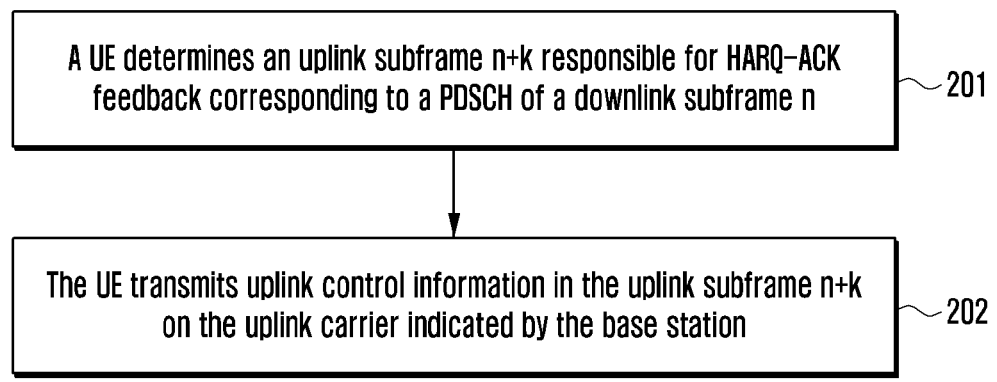

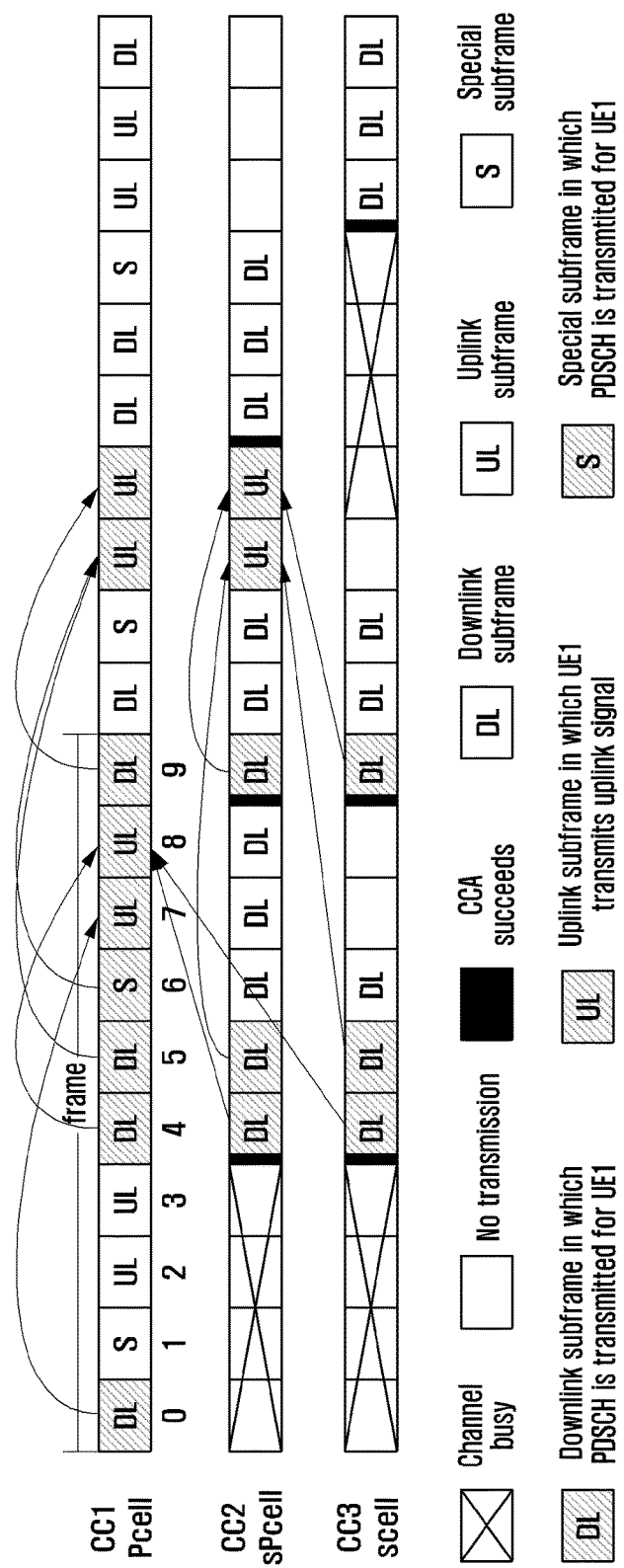

[Fig. 4]
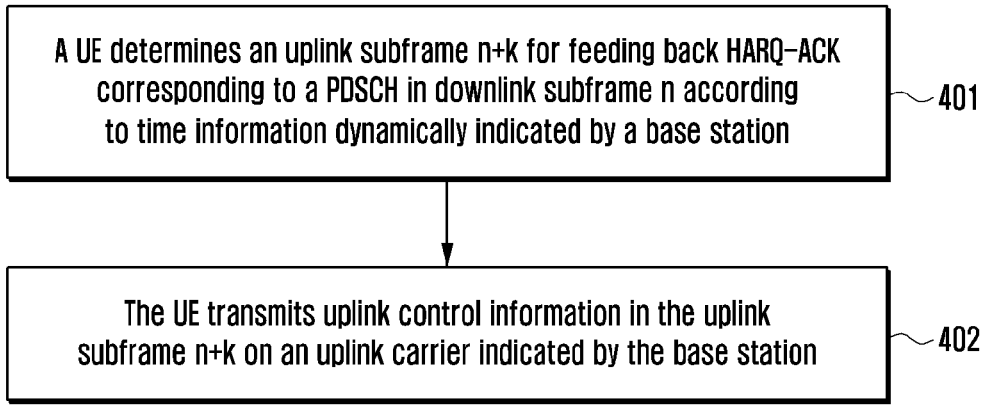
[Fig. 5]
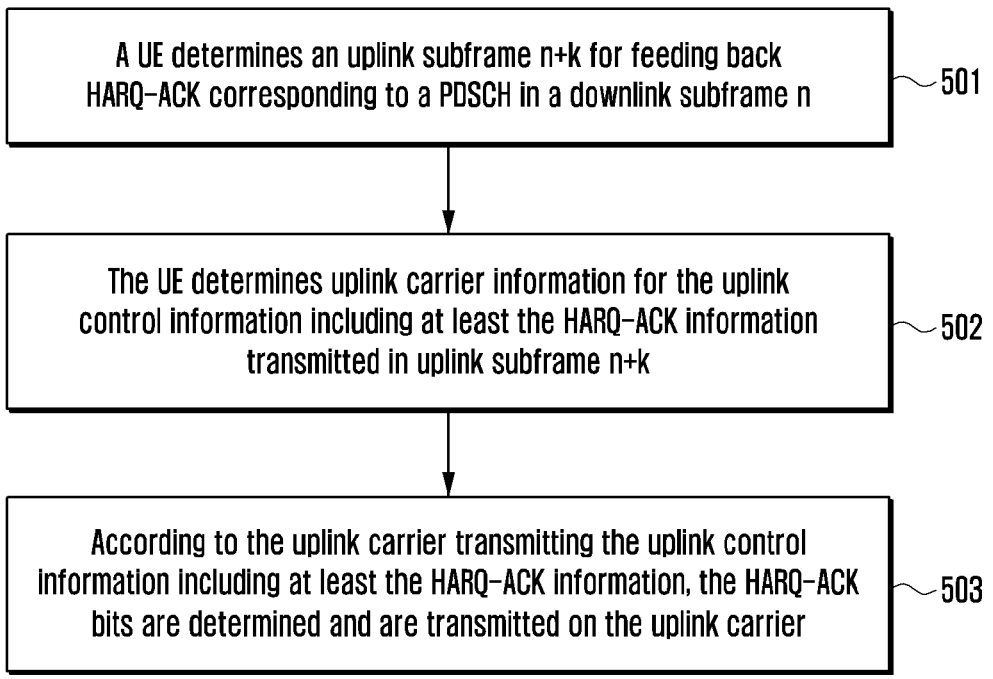

[Fig. 6]
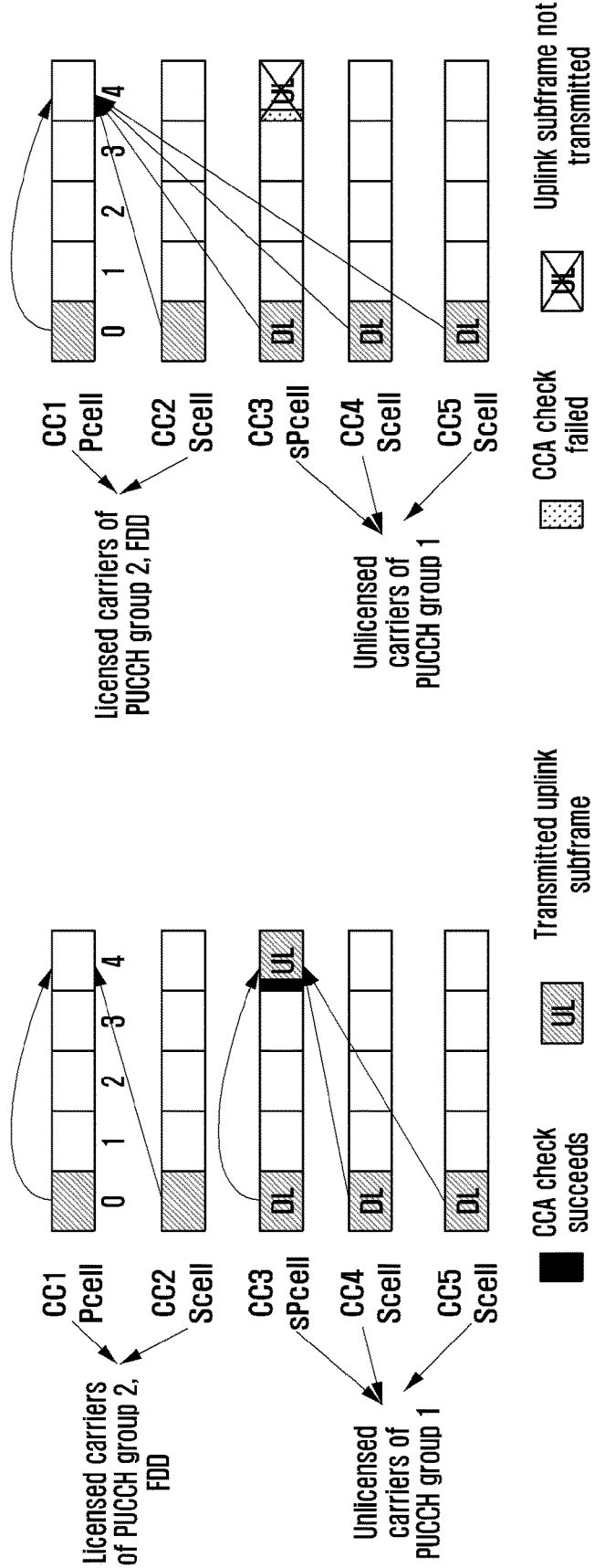

[Fig. 7]
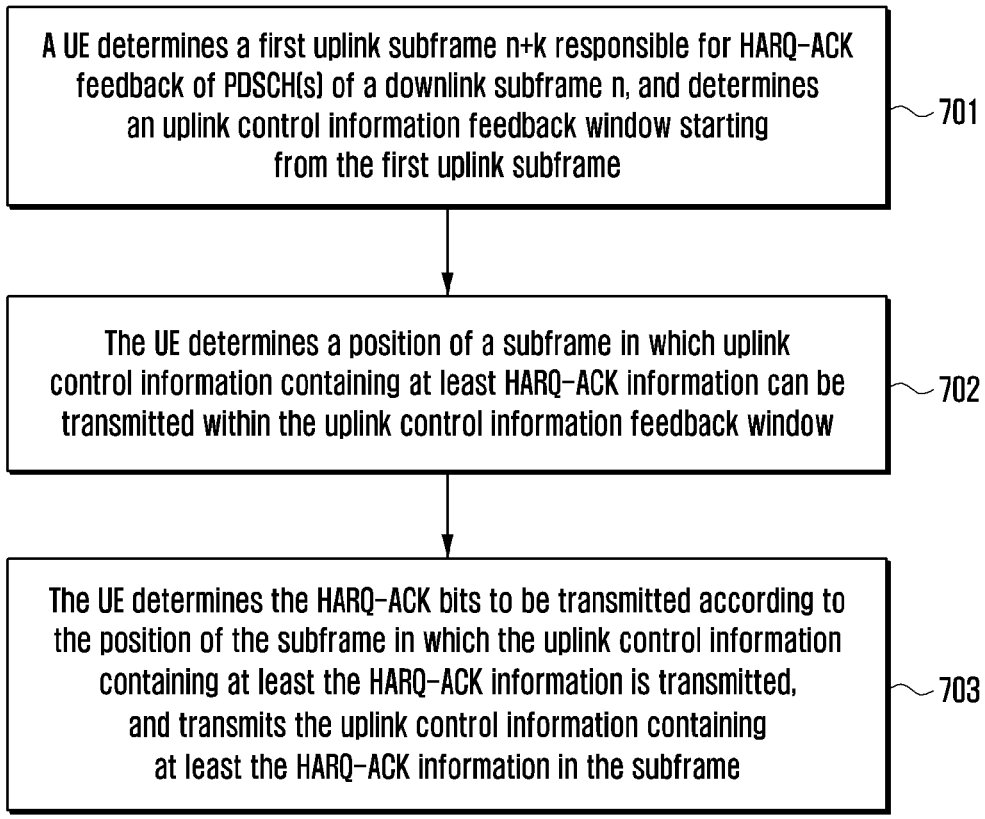
[Fig. 8A]
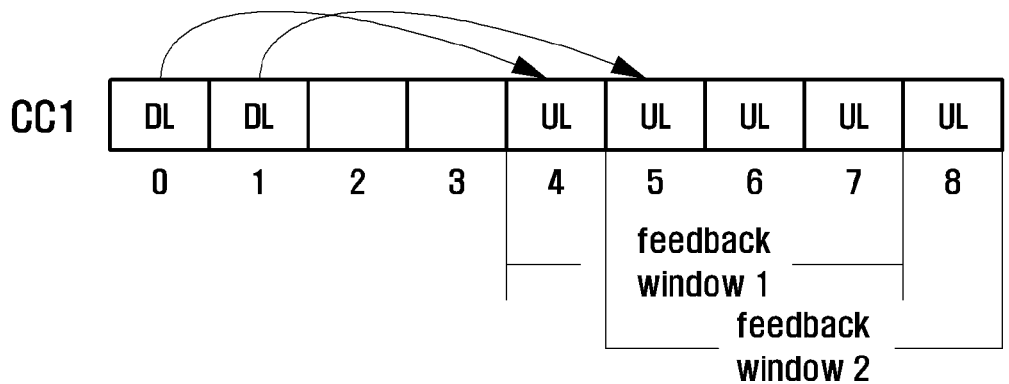
[Fig. 8B]
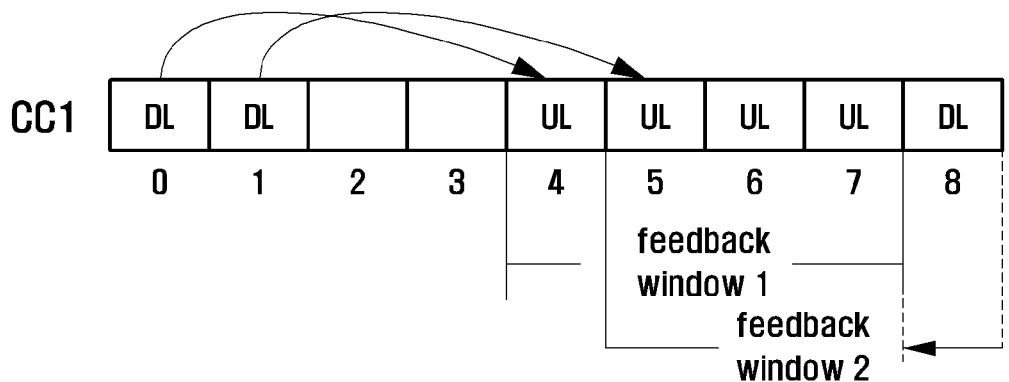

[Fig. 9]
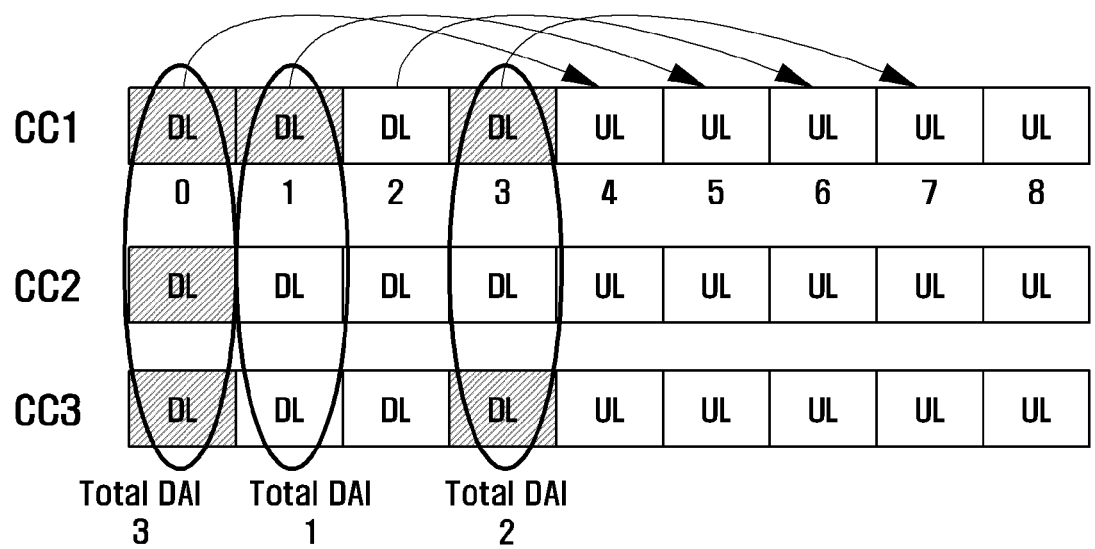

[Fig. 10]
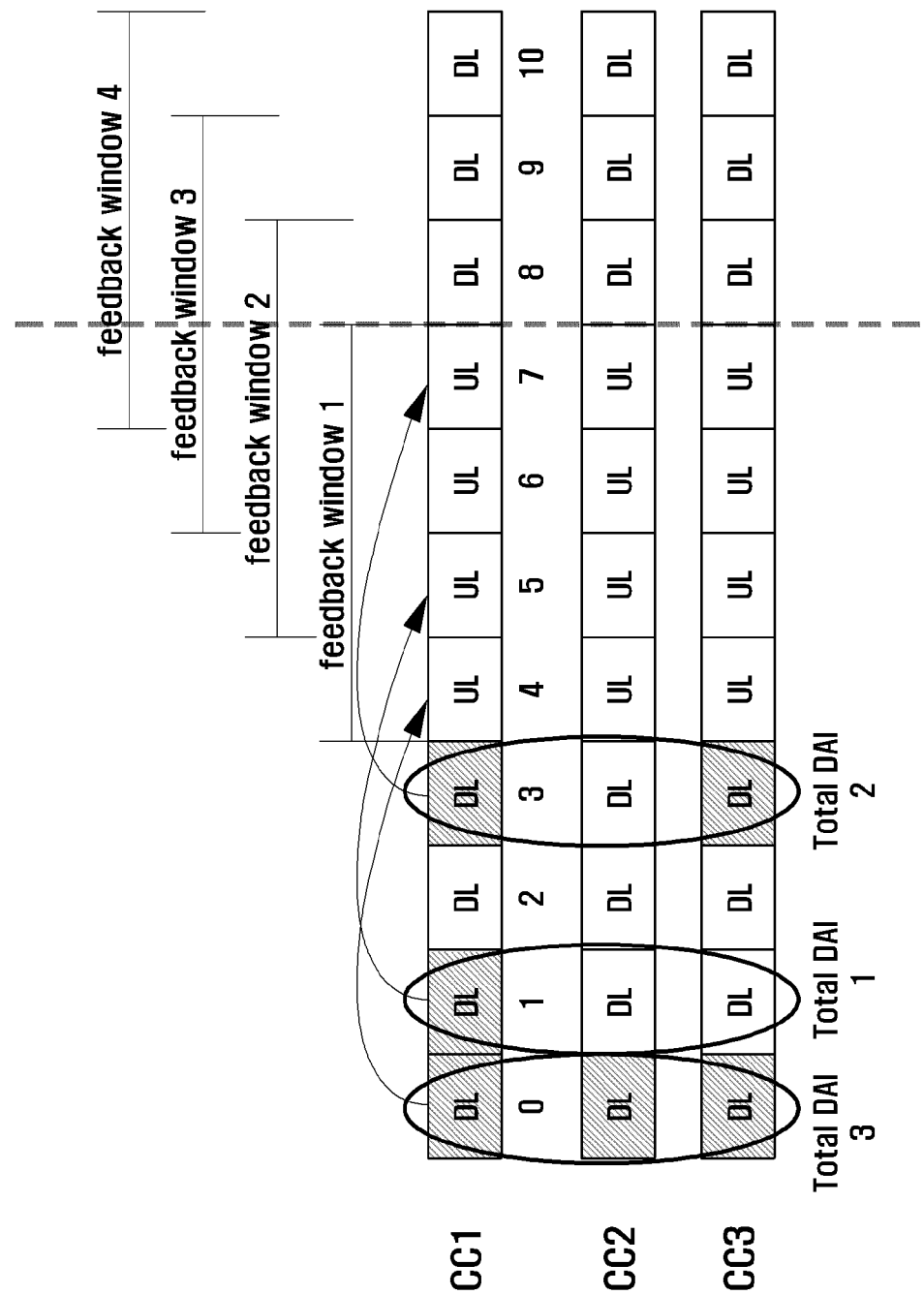

[Fig. 11]
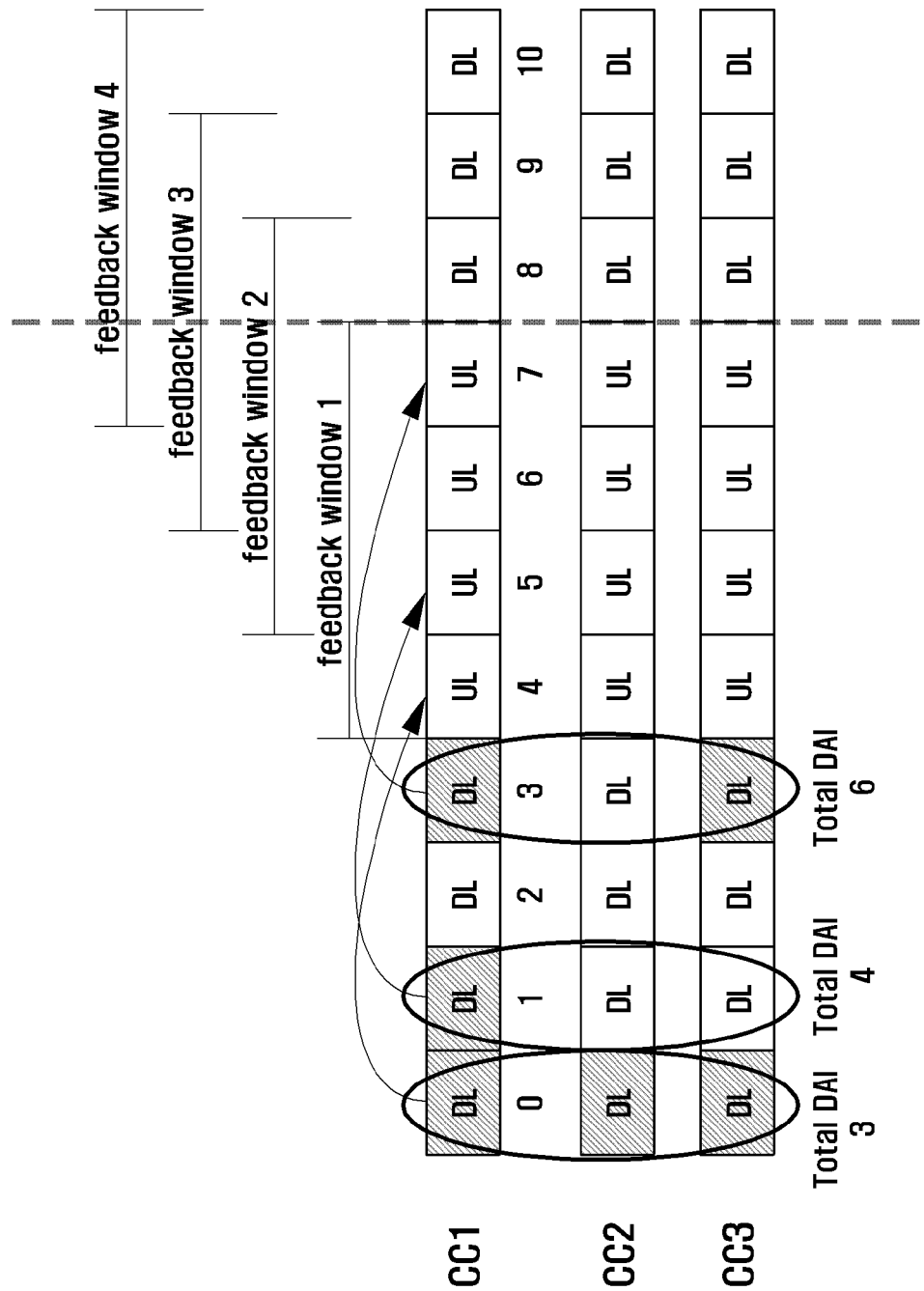

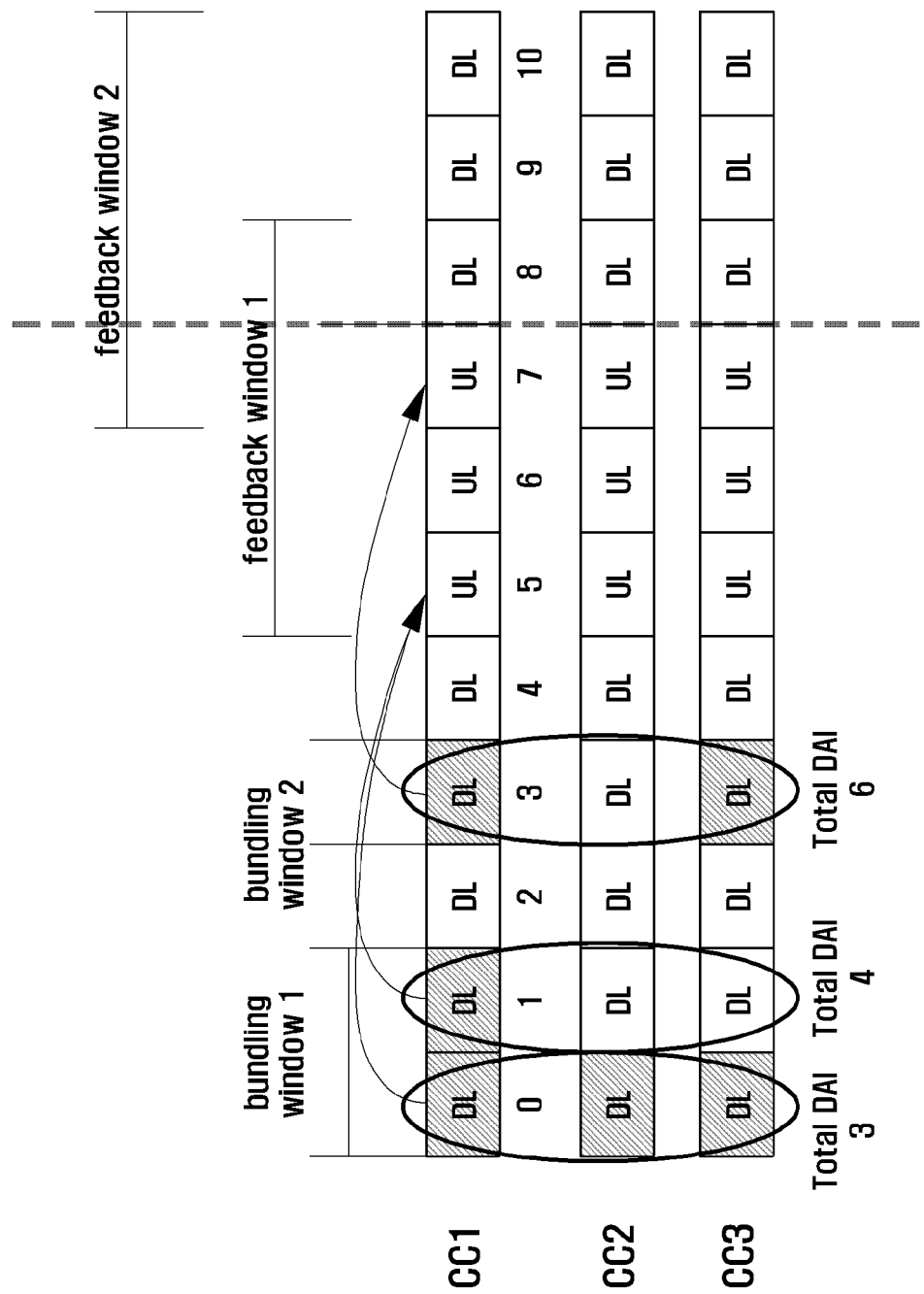
[Fig. 12]

[Fig. 13]
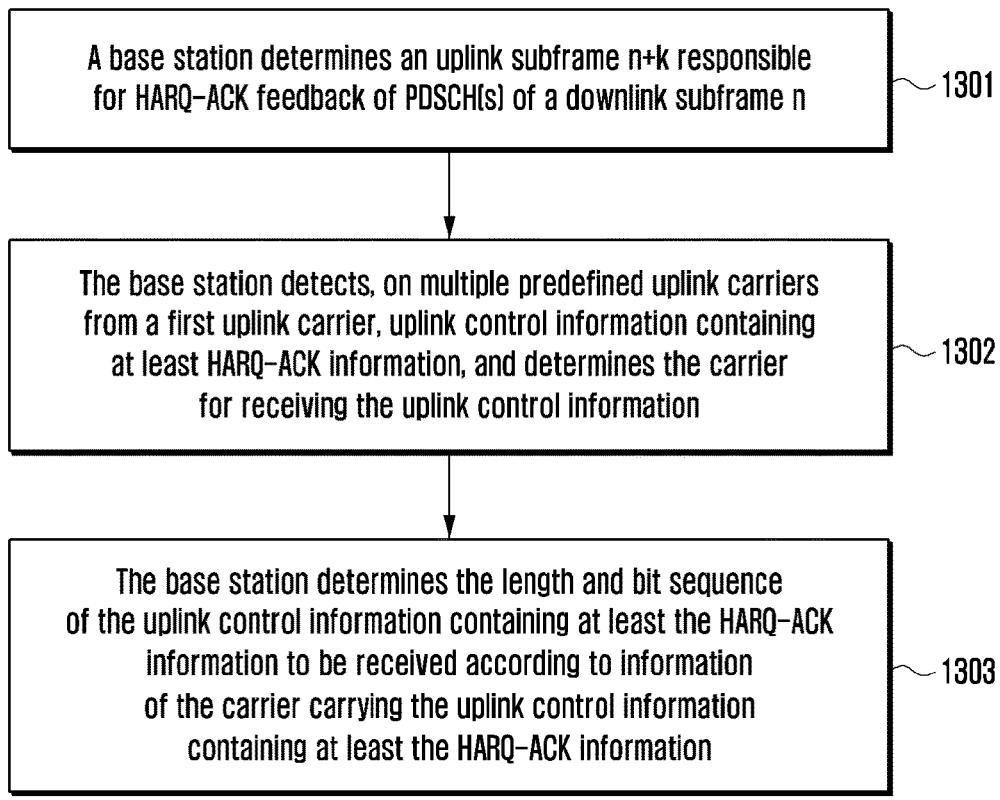
[Fig. 14]
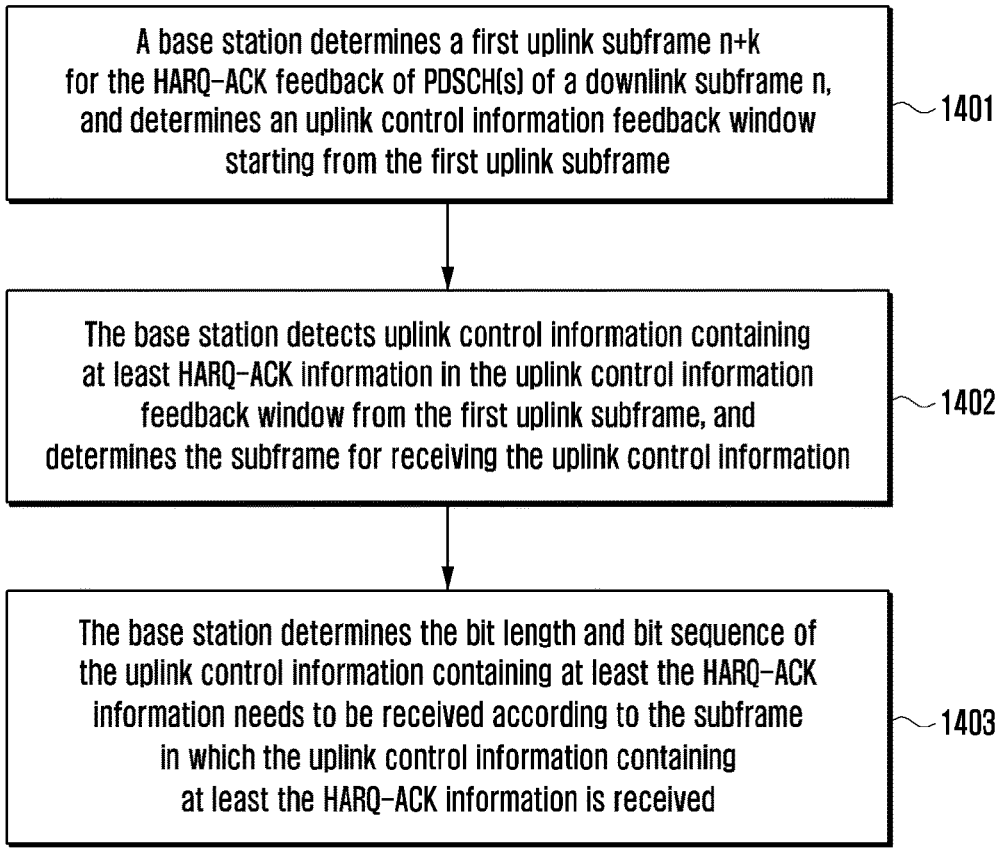

[Fig. 15]
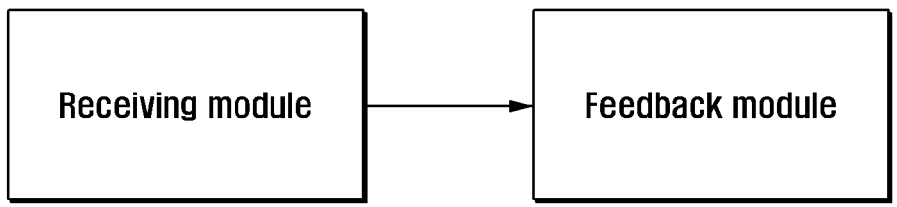
[Fig. 16]
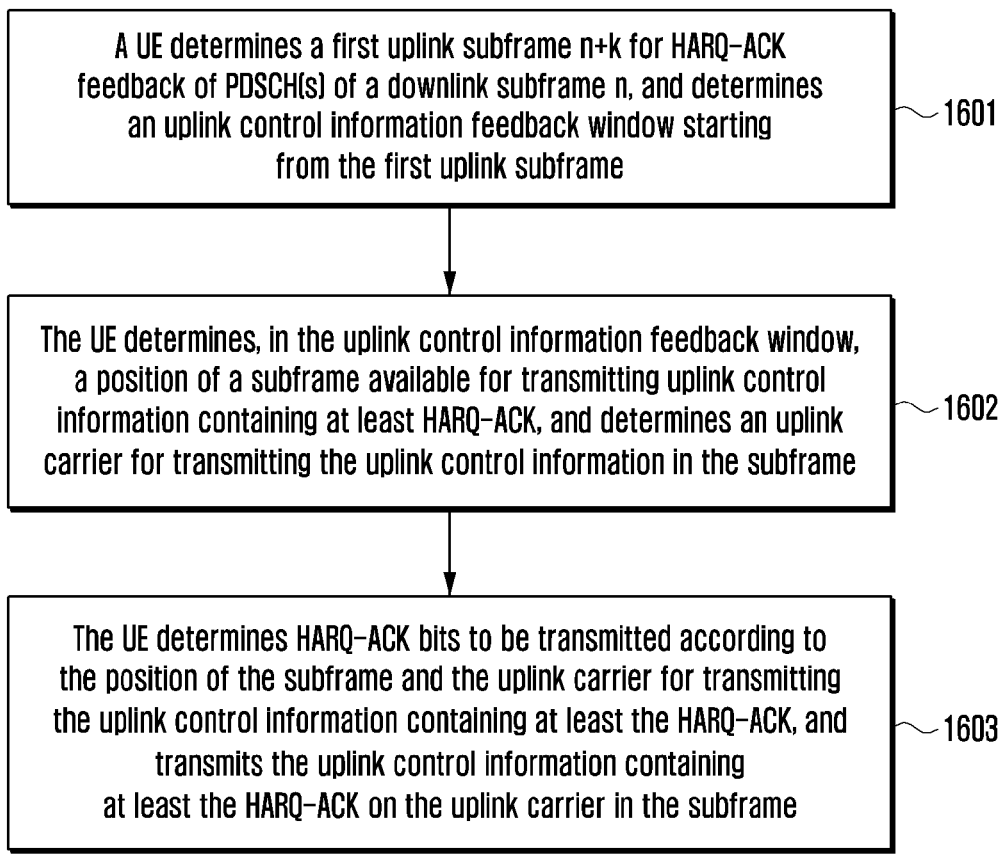

[Fig. 17]
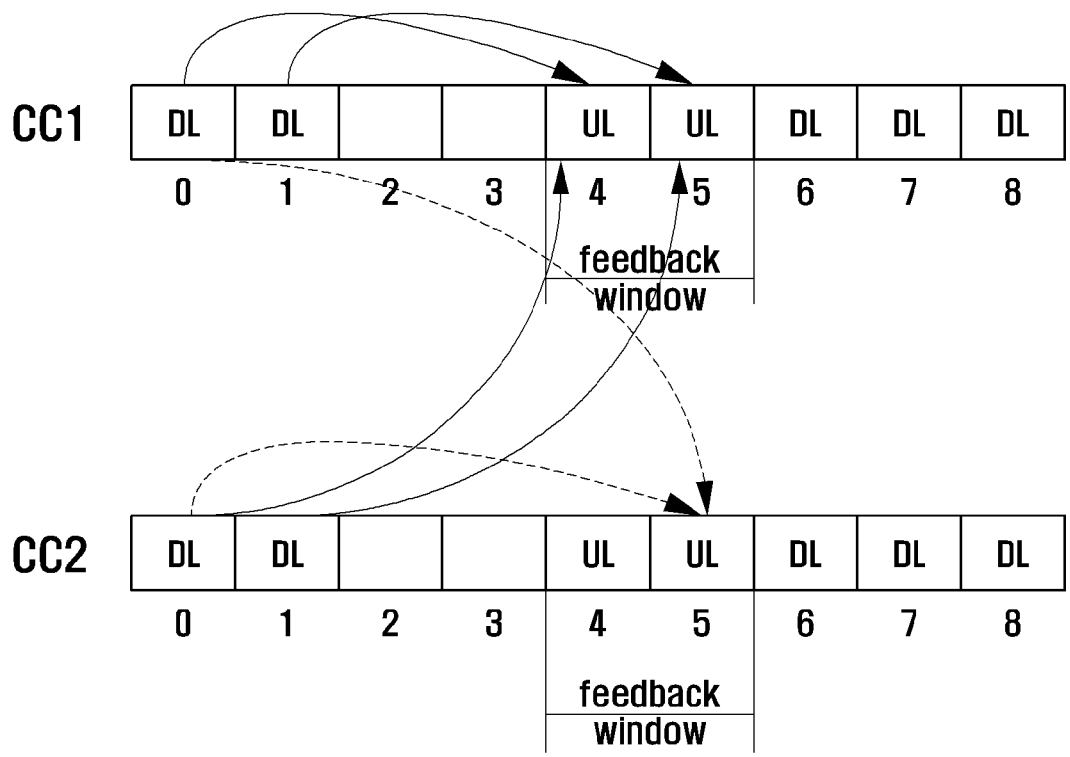
[Fig. 18]
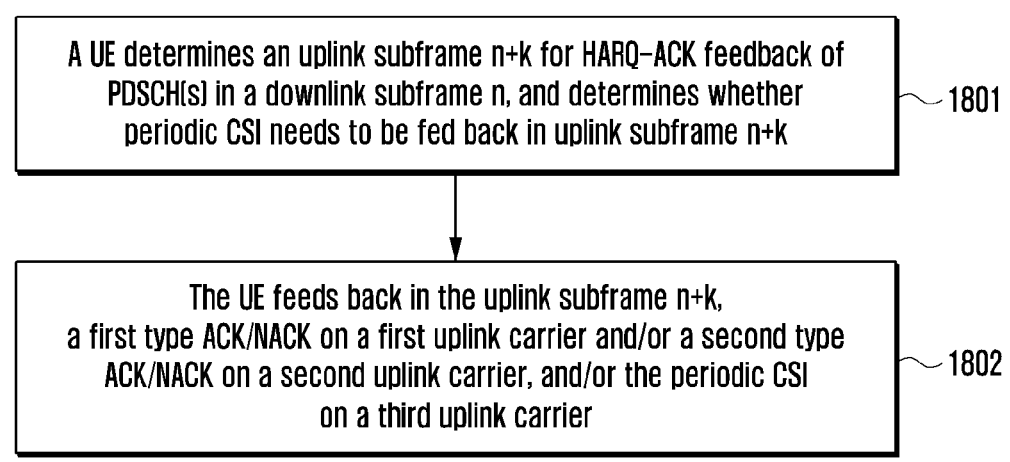

[Fig. 19]
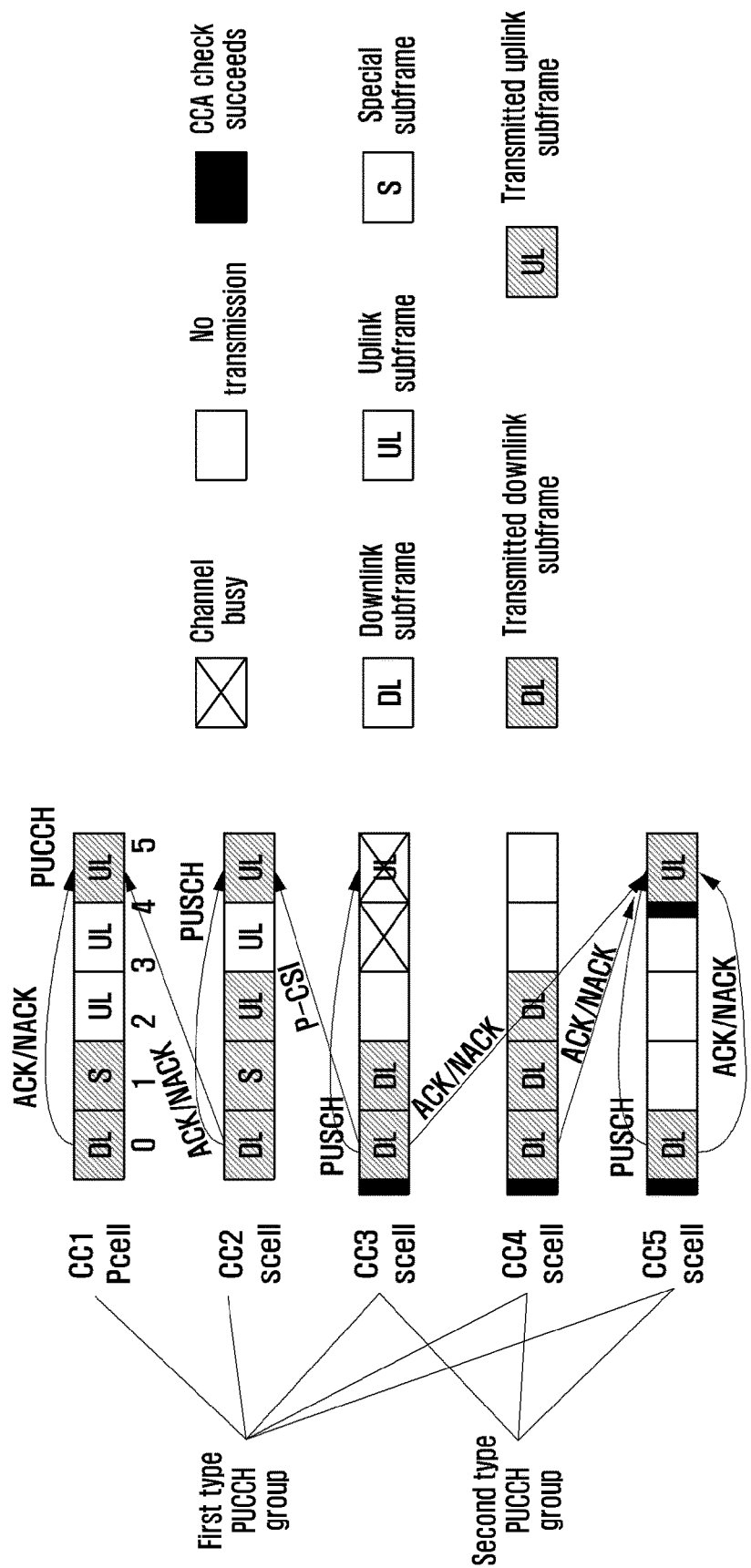

[Fig. 20]
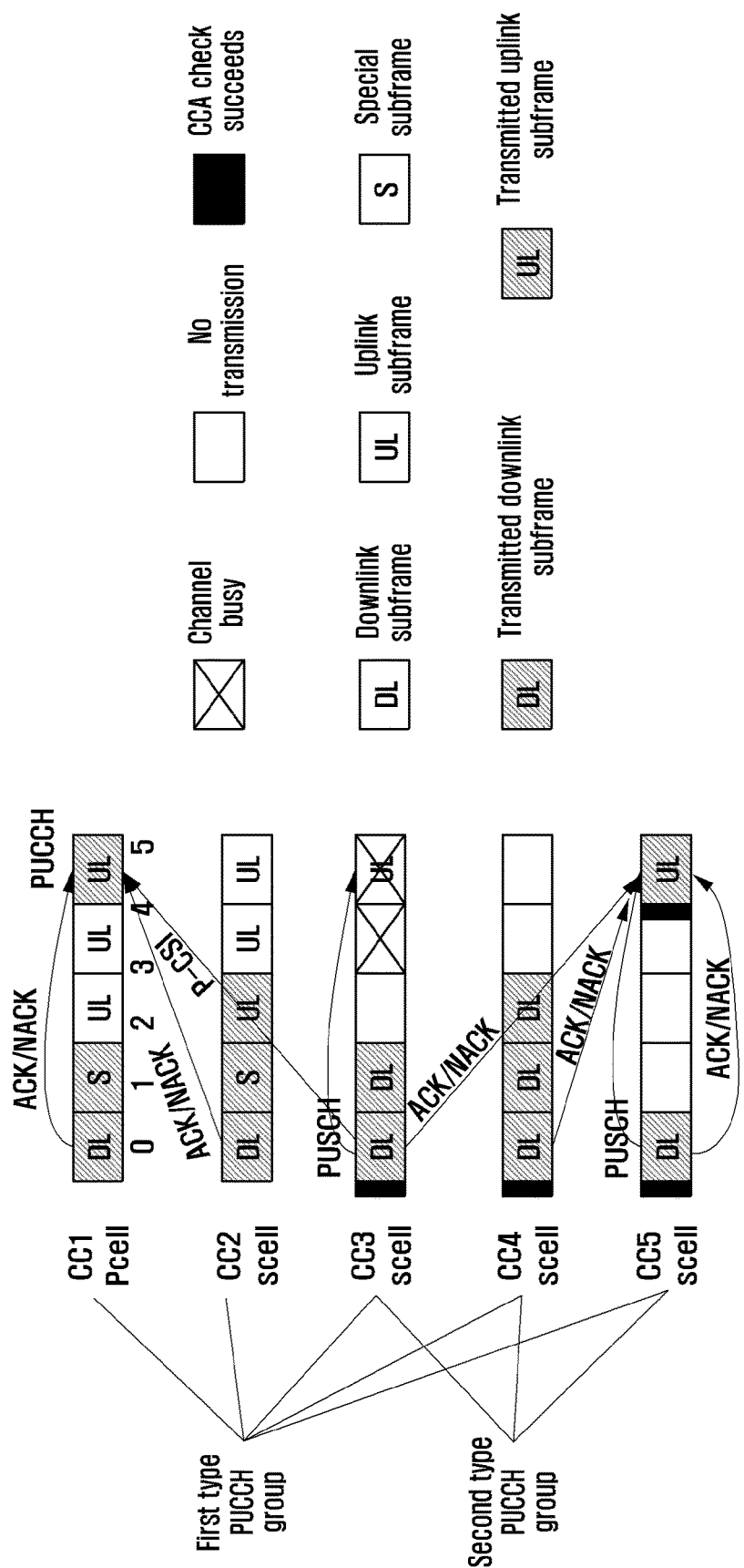

METHOD AND APPARATUS FOR FEEDING BACK HARQ-ACK INFORMATION

PRIORITY

This application is a National Phase Entry of PCT International Application No. PCT/KR2017/003079 which was filed on Mar. 22, 2017, and claims priority to Chinese Patent Application Nos. 201610204744.4, 201610293521.X, and 201610298403.8, which were filed on Apr. 1, 2016, May 5, 2016, and May 6, 2016, respectively, the content of each of which is incorporated herein by reference.

TECHNICAL FIELD

The present disclosure relates to radio communications technologies, more particularly to a method and an apparatus for feeding back HARQ-ACK information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Long-Term Evolution (LTE) system supports two duplex modes including Frequency Division Duplex (FDD) and Time Division Duplex (TDD). FIG. 1 shows a frame structure of a TDD system. Each radio frame is of 10 ms length and is divided into two 5 ms half-frames. Each half-frame includes eight 0.5 ms slots and three special fields, i.e., downlink pilot slot (DwPTS), guard period (GP) and uplink pilot slot (UpPTS). The total length of the three special fields is 1 ms. The TDD system supports 7 kinds of uplink-downlink configurations, as shown in Table 1. Herein, D denotes downlink subframe, U denotes uplink subframe, and S denotes a special subframe including the above three special fields.

TABLE 1

[uplink-downlink configurations of LTE TDD]

| Configuration index | Switching point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In the LTE-Advanced (LTE-A) system, a wider working bandwidth is obtained through combining multiple Component Carriers (CC) via a Carrier Aggregation (CA) technique, and therefore data transmission rate may be further increased. Each CC corresponds to one Cell. According to current LTE standard (Rel-12), a UE may work on at most 5 CCs at the same time, wherein one of them is a Primary Cell (Pcell), and other CCs are Secondary Cells (Scells).

In downlink communication of the LTE-A system, Hybrid Automatic Repeat reQuest (HARQ) technique is utilized to ensure reliability of downlink data receiving. The UE receives a DL-GRANT, wherein the DL-GRANT is carried by a Physical Downlink Control Channel (PDCCH) or an Enhanced Physical Downlink Control Channel (EPDCCH). Physical Downlink Shared Channel (PDSCH) is received according to indication information in the DL-GRANT. For each Transmission Block (TB) received via PDSCH, or received Physical Downlink Control Channel indicating release of semi-persistent scheduling (hereinafter the above two are referred to as downlink HARQ transmission), the UE needs to feed back ACK (correct receiving) bit or NACK (incorrect receiving or lost) bit to the base station via corresponding uplink subframe, hereinafter referred to as HARQ-ACK bit. If the base station receives the NACK bit, the base station re-transmits the TB corresponding to the NACK or the PDCCH indicating the release of the SPS. According to different HARQ-ACK mechanisms, the LTE-A standard defines corresponding method for determining the number of HARQ-ACK bits to be fed back and values of the HARQ-ACK bits.

In a FDD system, if the UE feeds back HARQ-ACK bit in an uplink subframe n via a Physical Uplink Shared Channel (PUSCH), the number of HARQ-ACK bits to be fed back is determined according to the number of carriers configured for the UE and a transmission mode (transmission mode supporting up to one TB or transmission mode supporting up to two TBs) of each carrier. For each carrier configured for the UE, if the transmission mode is one TB, the carrier corresponds to one HARQ-ACK bit. If the transmission mode is two TBs, the carrier corresponds to two HARQ-ACK bits. The bits are arranged according to an ascending order of the indexes of the carriers, to form a HARQ-ACK bit sequence that the UE finally feeds back in uplink subframe n (the HARQ-ACK bit sequence refers to that before channel coding, the same applies hereinafter).

In the TDD system, the number of HARQ-ACK bits to be fed back by the UE in an uplink subframe n is determined by an HARQ-ACK time-frequency bundling window, a Downlink Assignment Index (DL DAI) carried in UL Grant (UG) of subframe n, number of carriers configured for the UE, and the transmission mode configured for each carrier, in which:

the HARQ-ACK time-frequency bundling window is determined by a TDD uplink-downlink configuration corresponding to a HARQ-ACK timing relationship followed by the HARQ-ACK fed back of the UE, denoting all downlink subframes on one carrier whose HARQ-ACK is to be fed back in subframe n. The indexes of the downlink subframes are denoted by $n-k_i$, $k_i$ ÅK, wherein the dimension M of the set K is referred to as the size of the time-frequency bundling window. At present, the set K determined by the LTE standard with respect to the HARQ timing relationships corresponding to different TDD uplink-downlink configurations is as shown in Table 2. For facilitating the description, the subframe set K corresponding to the time-frequency bundling window determined by the HARQ timing relationship of FDD is defined as {4}, M=1 at this time.

UL DAI denotes a maximum number of downlink subframes actually have downlink HARQ transmission in the time-frequency bundling window configured for each carrier of the UE. For each carrier configured for the UE, the number of downlink subframes need to feed back HARQ-ACK in subframe n is Bc=min(Mc, UL DAI), wherein min denotes an operation of obtaining a minimum value, Mc denotes the size of the time-frequency bundling window corresponding to the carrier c. If he transmission mode of the current carrier is one TB, the number of HARQ-ACK bits corresponding to this carrier is Oc=Bc, and each subframe corresponds to one HARQ-ACK bit. If the transmission mode of the current carrier is two TBs, the number of HARQ-ACK bits corresponding to the carrier is Oc=2×Bc, and each downlink subframe corresponds to two HARQ-ACK bits.

TABLE 2

[set K: {k0, k1, ... kM−1} determined by different HARQ timing relationships]

| TDD uplink-downlink configuration | Subframe index | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |

TABLE 2-continued

[set K: {k0, k1, ... kM−1} determined by different HARQ timing relationships]

| TDD uplink-downlink configuration | Subframe index | | | | | | | | | |
|---|---|---|---|---|---|---|---|---|---|---|
| | 0 | 1 | 2 | 3 | 4 | 5 | 6 | 7 | 8 | 9 |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the TDD system, the HARQ-ACK bit sequence needs to be fed back by the UE is determined by a sum $O_{UE}$ of HARQ-ACK bits corresponding to all carriers. If $O_{UE}$ is not larger than 20, the HARQ-ACK bit of each carrier is arranged according to an ascending order of the carrier indexes to form the HARQ-ACK bit sequence to be fed back by the UE. Otherwise, if $O_{UE}$ is larger than 20, for all carriers whose transmission mode is two TBs, an "OR" calculation (i.e., spatial bundling) is performed to the two HARQ-ACK bits corresponding to two TBs of each subframe, to obtain one HARQ-ACK bit. For the carriers whose transmission mode is one TB, the HARQ-ACK bit corresponding to each subframe is remained unchanged. After the above processing, the HARQ-ACK bit of each carrier of the UE is arranged according to the ascending order of the carrier indexes to generate the HARQ-ACK bit sequence to be fed back by the UE.

It can be seen from the above description that, in the HARQ-ACK feedback mechanism defined by existing standard (LTE Release-12 and those before Release-12), the HARQ-ACK bit sequence finally fed back by the UE may include a HARQ-ACK bit corresponding to a downlink subframe which has no downlink HARQ transmission. For example, in the FDD system, whether or not there is downlink HARQ-ACK transmission on the carrier, the HARQ-ACK bit sequence fed back by the UE always includes an HARQ-ACK bit corresponding to that carrier. In the TDD system, the UE determines the number of downlink subframes having downlink HARQ transmission on each carrier according to Bc, but the value of Bc may be larger than the number of downlink subframes actually having downlink HARQ transmission in the time-frequency bundling window corresponding to the carrier. According to the current standard, the UE supports at most 5 carriers. Therefore, the existence of the nonsense HARQ-ACK bit does not have much impact to the system performance.

However, in order to further increase the downlink peak rate of the UE, it is well recognized by 3GPP member companies that the maximum number of carriers supported by the UE should be increased. The number of carriers supported by the UE will be increased to 32, wherein carriers on the unlicensed band may be included. With the increase of the number of downlink carriers supported by the UE, the absolute value of non-scheduled downlink subframes may increase accordingly. Therefore, the impact brought out by the nonsense HARQ-ACK bit is enlarged. In this case, if the current HARQ-ACK feedback mechanism is still utilized, the efficiency for feeding back information will decrease and finally affect the downlink peak rate of the UE, which contradicts to the initial objective of increasing the number of carriers. Therefore, in LTE Release-13, new bits are introduced, Total DAI and counter DAI (TS 36.212 Table 5.3.3.1.2-2). In the TDD system, the Total DAI indicates a total number of scheduled PDSCHs in all subframes and on all carriers from the first subframe to a current subframe in the HARQ-ACK time-frequency bundling window. The counter DAI indicates a total number of scheduled PDSCHs on all carriers before the current subframe in the HARQ-ACK bundling window and the scheduled PDSCHs on carriers from a carrier with minimum index to the carrier in the current subframe. In the FDD system, the total DAI indicates a total number of scheduled PDSCHs on all carriers in the current subframe, and the counter DAI indicates a total number of scheduled PDSCHs on carriers from a carrier with minimum index to the carrier in the current subframe. When the UE feeds back the HARQ-ACK, the number of HARQ-ACK bits is determined according to the total DAI, and the sequence of the HARQ-ACK bits is determined according to the counter DAI.

With the increasing shortage of spectrum resources, 3GPP begins the research on data transmission on unlicensed band. In LTE Release-13, an LTE device may operate on both the licensed band and the unlicensed band at the same time, via a carrier aggregation or double connection manner. An apparent difference between a licensed carrier and an unlicensed carrier is that, data transmission of the LTE device on the unlicensed band is based on listen before talk (LBT), i.e., the LTE device has to sense a busy/idle state of the unlicensed carrier. Only when the unlicensed carrier is idle, the LTE device is able to transmit on the carrier. Since the LTE device cannot accurately predict when the unlicensed carrier will be idle, the transmission of the LTE device on the unlicensed carrier is uncertain, i.e., it cannot be predicted that whether it can transmit in subframe n.

DISCLOSURE OF INVENTION

Technical Problem

In LTE Release-14 system, uplink control signal can be transmitted on the unlicensed band. Since the transmission is based on LBT and the unlicensed band does not have a fixed uplink-downlink configuration, and the UE also cannot ensure that it can transmit uplink signal in an uplink subframe, when the uplink control signal is transmitted on the unlicensed carrier, the HARQ-ACK feedback cannot be transmitted according to the semi-statically configured HARQ-ACK timing. Therefore, how to effectively transmit uplink control signal on the unlicensed carrier is an urgent problem to be solved.

Solution to Problem

Embodiments of the present disclosure provide a method for feeding back HARQ-ACK information. The method includes:

in a time-frequency bundling window corresponding to an uplink subframe in a feedback window of a first uplink subframe for feeding back HARQ-ACK, receiving a physical downlink control channel (PDCCH) or an enhanced PDCCH (EPDCCH) scheduling downlink HARQ transmission, obtaining a downlink assignment index (DL DAI) in a DL-assignment, and determining a mapping value of each DL DAI;

determining a second uplink subframe for feeding back the HARQ-ACK, and determining an uplink carrier for feeding back the HARQ-ACK;

mapping HARQ-ACK bits of each HARQ feedback unit to corresponding bits of a feedback bit sequence according to the mapping value of the DL DAI; and feeding back the HARQ-ACK bits on the uplink carrier in the second uplink subframe.

In some embodiments, the first uplink subframe for feeding back the HARQ-ACK is determined according to indication information in received physical layer signaling, and/or the first uplink subframe for feeding back the HARQ-ACK is determined according to a reference carrier and an HARQ-ACK timing of a carrier on which PDSCH is received.

In some embodiments, the feedback window of the first uplink subframe for feeding back the HARQ-ACK starts from the first uplink subframe, and the length of the feedback window is configurable.

In some embodiments, the second uplink subframe is within the feedback window.

In some embodiments, the time-frequency bundling window includes all downlink subframes whose HARQ-ACK need to be fed back in the first uplink subframe, and the HARQ-ACK of the downlink subframes are arranged according to a predefined rule.

In some embodiments, the mapping the HARQ-ACK bits of each HARQ feedback unit to the corresponding bits of the feedback bit sequence according to the mapping value of the corresponding DL DAI includes: determining whether there is another second uplink subframe which belongs to another feedback window and overlaps with the second uplink subframe;

if there is no other second uplink subframe in other feedback window, determining the number of HARQ-ACK bits according to the number of physical downlink shared channels (PDSCHs) actually being scheduled in all downlink subframes in a time-frequency bundling window of the first uplink subframe corresponding to the second uplink subframe, and determining the sequence of the HARQ-ACK bits according to a predefined rule;

if there is another second uplink subframe in another feedback window, determining a number of first type HARQ-ACK bits according to a maximum number of PDSCHs can be scheduled in all downlink subframes of the time-frequency bundling window of a first uplink subframe corresponding to the another second uplink subframe in the another feedback window, and determining a number of a second type HARQ-ACK bits according to the number of PDSCHs actually being scheduled in all downlink subframes in the time-frequency bundling window of the first uplink subframe corresponding to the second uplink subframe of the feedback window, and determining the sequence of the two types of HARQ-ACK bits according to a predefined rule.

In some embodiments, the number of PDSCHs actually being scheduled is determined according to a received total DAI and/or counter DAI; and/or, The maximum number of PDSCHs can be scheduled is determined according to a number of configured carriers.

In some embodiments, the mapping the HARQ-ACK bits of each HARQ feedback unit to the corresponding bits of the feedback bit sequence according to the mapping value of the corresponding DL DAI includes: determining whether there is another second uplink subframe which belongs to another feedback window and overlaps with the second uplink subframe;

if there is no other second uplink subframe in other feedback window, determining the HARQ-ACK bits according to the PDSCHs actually being scheduled in all downlink subframes in the time-frequency bundling window of the first uplink subframe corresponding to the second uplink subframe of the feedback window;

if there is another second uplink subframe in another feedback window, determining a first type HARQ-ACK bits according to the PDSCHs actually being scheduled in all downlink subframes in the time-frequency bundling window of a first uplink subframe corresponding to the another second uplink subframe in the another feedback window, and determining a second type HARQ-ACK bits according to the PDSCHs actually being scheduled in all downlink subframes of the time-frequency bundling window of the first uplink subframe corresponding to the second uplink subframe of the feedback window, and determining a sequence of the two types of HARQ-ACK bits according to a predefined rule.

In some embodiments, the number of PDSCHs actually being scheduled is determined according to at least the received total DAI and/or counter DAI.

In some embodiments, the predefined rule includes: determining the sequence of the two types of HARQ-ACK bits according to a sequence of the first uplink subframes respectively corresponding to the two types of HARQ-ACK bits, wherein the HARQ-ACK bits corresponding to the first uplink subframe which is earlier in time are placed in the front, and the HARQ-ACK bits corresponding to the first uplink subframe which is latter in time are placed behind.

In some embodiments, values of the total DAI and/or counter DAI are determined cumulatively in time-frequency bundling windows corresponding to all uplink subframes in the feedback window.

In some embodiments, the determining the uplink carrier for feeding back the HARQ-ACK includes:

determining the uplink carrier for feeding back the HARQ-ACK according to indication information in received physical layer signaling; and/or determining the uplink carrier for feeding back the HARQ-ACK according to a current channel busy/idle state, and/or determining the uplink carrier for feeding back the HARQ-ACK according to indication information in received higher layer signaling, wherein the uplink carrier merely responsible for feeding back the HARQ-ACK of an unlicensed carrier is a first uplink carrier, and the uplink carrier responsible for feeding back the HARQ-ACK of licensed carrier and/or unlicensed carrier is a second uplink carrier.

In some embodiments, the process of determining the uplink carrier for feeding back the HARQ-ACK according to the channel busy/idle state further includes: if the channel is currently busy, an index of an uplink carrier for feeding back the HARQ-ACK corresponding to the current subframe is 1 less than that of the uplink carrier for feeding back the HARQ-ACK corresponding to a next subframe.

In some embodiments, when feeding back the HARQ-ACK on the first uplink carrier and mapping the HARQ-ACK bits of each HARQ feedback unit to the corresponding bits of the feedback bit sequence according to the mapping value of the corresponding DL DAI, determining the HARQ-ACK bits according to the PDSCHs actually being scheduled in all downlink subframes in the time-frequency bundling window corresponding to the first uplink carrier; and/or feeding back the HARQ-ACK on the second uplink carrier, and do not feeding back the HARQ-ACK on the first uplink carrier, determining the number of a first type HARQ-ACK bits according to a maximum number of PDSCHs can be scheduled in all downlink subframes in the time-frequency bundling window corresponding to one of the first uplink carrier and the second uplink carrier which one has a minimum carrier index, and determining a number of second type HARQ-ACK bits according to the PDSCHs actually being scheduled in all downlink subframes in the time-frequency bundling window corresponding to one of the first uplink carrier and the second uplink carrier which has a maximum carrier index; the first type HARQ-ACK bits are arranged in the front and the second type HARQ-ACK bits are arranged behind the first type HARQ-ACK bits.

In some embodiments, the number of PDSCHs actually being scheduled is determined according to a received total DAI and/or counter DAI; and/or the maximum number of PDSCHs can be scheduled is determined according to a number of configured carriers.

Embodiments of the present disclosure further provide a method for feeding back channel state information (CSI), including:

in an uplink subframe for feeding back uplink control information including at least CSI, determining a third uplink carrier on a licensed band for feeding back the uplink control information, and determining an uplink physical channel for carrying the uplink control information on the third uplink carrier; and feeding back the uplink control information including at least the CSI on the uplink physical channel on the third uplink carrier.

In some embodiments, periodic CSI of an unlicensed carrier is transmitted on a Pcell or a licensed carrier configured by a base station; if the uplink control information includes merely the periodic CSI, the uplink control information is transmitted on the primary cell or PUCCH on the licensed carrier configured by the base station; and/or if the uplink control information includes both periodic CSI and HARQ-ACK, and a physical uplink shared channel (PUSCH) is scheduled on at least one licensed carrier, a UE transmitting the periodic CSI on one of the at least one licensed carrier where the PUSCH is scheduled, and transmitting the HARQ-ACK on the Pcell or the PUCCH of the licensed carrier configured by the base station; and/or if the uplink control information includes both periodic CSI and HARQ-ACK, and no PUSCH is scheduled on a licensed carrier, the UE transmitting the HARQ-ACK and the CSI on the Pcell or the PUCCH on the licensed carrier configured by the base station.

Embodiments of the present disclosure further provide an apparatus for feeding back HARQ-ACK information, including:

a receiving module, configured to receive a DL-GRANT scheduling downlink HARQ transmission in a time-frequency bundling window corresponding to an uplink subframe for feeding back HARQ-ACK and/or time-frequency bundling windows corresponding to all uplink subframes in a feedback window of uplink subframes for feeding back HARQ-ACK, obtain a DL DAI and/or a total DAI and/or a counter DAI in the DL-GRANT, and determine a mapping value of each DAI; and a feedback module, configured to map HARQ-ACK bits of each HARQ feedback unit to corresponding bits of a feedback bit sequence according to the mapping value of the corresponding DAI.

Advantageous Effects of Invention

According to the method and apparatus provided by the present disclosure, efficiency for feeding back the HARQ-ACK can be increased and downlink peak rate of the UE can be ensured

BRIEF DESCRIPTION OF DRAWINGS

FIG. 1 is a schematic diagram illustrating a frame structure of an existing TDD system.

FIG. 2 is a flowchart illustrating a method for feeding back HARQ-ACK information according to some embodiments of the present disclosure.

FIG. 3 is a schematic diagram illustrating a method for feeding back HARQ-ACK information based on the HARQ-ACK timing of existing TDD-FDD carrier aggregation according to some embodiments of the present disclosure, in which it is assumed that the unlicensed carrier follows the HARQ-ACK timing of FDD according to some embodiments of the present disclosure.

FIG. 4 is a flowchart illustrating another method for feeding back HARQ-ACK information according to some embodiments of the present disclosure.

FIG. 5 is a flowchart illustrating yet another method for feeding back HARQ-ACK information according to some embodiments of the present disclosure.

FIG. 6 is a schematic diagram illustrating a method for feeding back HARQ-ACK information via an uplink carrier dynamically selected based on busy/idle state of the carriers according to some embodiments of the present disclosure.

FIG. 7 is a flowchart illustrating still another method for feeding back HARQ-ACK information according to some embodiments of the present disclosure.

FIG. 8 is a schematic diagram illustrating a feedback window according to some embodiments of the present disclosure.

FIG. 9 is a schematic diagram illustrating a method for feeding back HARQ-ACK information according to some embodiments of the present disclosure.

FIG. 10 is a schematic diagram illustrating another method for feeding back HARQ-ACK information according to some embodiments of the present disclosure.

FIG. 11 is a schematic diagram illustrating still another method for feeding back HARQ-ACK information according to some embodiments of the present disclosure.

FIG. 12 is a schematic diagram illustrating yet another method for feeding back HARQ-ACK information according to some embodiments of the present disclosure.

FIG. 13 is a schematic diagram illustrating an HARQ-ACK information receiving method according to some embodiments of the present disclosure.

FIG. 14 is a schematic diagram illustrating another HARQ-ACK information receiving method according to some embodiments of the present disclosure.

FIG. 15 is a schematic diagram illustrating a structure of an apparatus for feeding back HARQ-ACK information according to some embodiments of the present disclosure.

FIG. 16 is a schematic diagram illustrating another method for feeding back HARQ-ACK information according to some embodiments of the present disclosure.

FIG. 17 is a schematic diagram illustrating yet another method for feeding back HARQ-ACK information according to some embodiments of the present disclosure.

FIG. 18 is a schematic diagram illustrating a method for feeding back CSI information according to some embodiments of the present disclosure.

FIG. 19 is a schematic diagram illustrating another method for feeding back CSI information according to some embodiments of the present disclosure.

FIG. 20 is a schematic diagram illustrating yet another method for feeding back CSI information according to some embodiments of the present disclosure.

MODE FOR THE INVENTION

The present disclosure will be described in detail hereinafter with reference to accompanying drawings and embodiments to make the technical solution and merits therein clearer.

In current HARQ-ACK feedback mechanism, the timing of uplink subframe responsible for carrying ACK/NACK feedback of corresponding PDSCH is fixed. In FDD systems, if a UE receives the PDSCH in subframe n, the UE feeds back HARQ-ACK information on a corresponding uplink carrier of subframe n+k, wherein k is a pre-defined value, e.g., k=4. The uplink carrier may be a primary uplink carrier (Pcell) or a primary secondary uplink carrier (pScell). In TDD systems, as described in the background, the system semi-statically configures the uplink-downlink configuration (as shown in Table 1) or dynamically indicates the uplink-downlink configuration on the basis of the semi-static configuration. Thus, the UE is able to determine a unique value of k (as shown in Table 2) for the subframe n+k responsible for the HARQ-ACK feedback of the PDSCH of each downlink subframe according to the uplink-downlink configuration.

However, in LAA systems, since the uplink-downlink configuration of unlicensed carrier varies dynamically and is not limited to the existing 7 uplink-downlink configurations in TDD systems, if the HARQ-ACK is transmitted on the unlicensed carrier, the value of k of subframe n+k responsible for the HARQ-ACK feedback of the PDSCH of downlink subframe n cannot be determined according to the current TDD configuration and Table 2. In order to solve this problem, one method is: not dynamically change the value of k according to the uplink-downlink subframe situation of the unlicensed carrier, but determine the value of k according to the uplink-downlink configuration of a licensed carrier. Another method is: dynamically indicate the value of k via physical layer signaling. The indication may be explicit or implicit. For example, the value of k may be determined through (1) explicitly indicating the value of k in downlink DCI scheduling the PDSCH, or (2) explicitly indicating, in downlink common DCI which is used for indicating uplink-downlink transmission burst information, the value of k or the uplink-downlink subframe configuration information, so as to determine the value of k. In the embodiments of the present disclosure, manner (1) or (2) may be applied.

Another problem of the LAA system relies in that, if an uplink subframe in which the base station expects the UE to transmit uplink control signal cannot be used for uplink transmission, e.g., in the subframe, channel is occupied by WiFi, then (1) the UE needs to try to transmit on another carrier in the subframe, or (2) try to transmit in another subframe on the same carrier, or (3) a combination of the above. In embodiments of the present disclosure, any one or any combination of the manners (1), (2) and (3) may be applied.

In embodiments of the present disclosure, the HARQ-ACK information may be carried by PUCCH and/or PUSCH.

In embodiments of the present disclosure, the HARQ-ACK of downlink carriers in the same PUCCH group is generally transmitted on one uplink carrier in the PUCCH group, but not transmitted on the uplink carrier of another PUCCH group, unless a predefined condition is met. For example, the predefined condition is CCA check failed. For another example, the predefined condition is an indication for transmitting on another uplink carrier is received. Thus, the PUCCH group may include the HARQ-ACK information of the downlink carriers of the PUCCH group, or include both the HARQ-ACK information of the downlink carriers of the PUCCH group and the HARQ-ACK information of another group.

In some embodiments, in the PUCCH group, it is not restricted that there is an uplink carrier available for transmitting the PUCCH. For example, in a PUCCH group consists of unlicensed carriers, there may be no PUCCH but merely PUSCH. The PUSCH may carry uplink control information. The carrier transmitting the PUCCH carrying the uplink control information may be configured semi-statically or predefined by standards, e.g., the uplink carrier configured as the pScell, or may be determined according to a predefined rule, e.g., an uplink carrier with a minimum Scellindex among those transmitting PUSCH, or an uplink carrier with a minimum Scellindex among those whose PUSCH is scheduled, or other rules.

In some embodiments, in the PUCCH group, it is defined that there must be an uplink carrier available for transmitting the PUCCH. The carrier transmitting the PUCCH may be configured semi-statically or predefined by standards, e.g. the uplink carrier configured as the pScell, or determined according to a predefined rule.

For facilitating the description, in embodiments of the present disclosure, each of the above PUCCH groups is referred to as a PUCCH group in general. Meanwhile, in embodiments of the present disclosure, the PUCCH group which is able to transmit the PUCCH is referred to as a first type PUCCH group, the PUCCH group which is only able to transmit PUSCH is referred to as a second type PUCCH group. The two types of PUCCH groups may be independent or associated with each other. For example, the second type PUCCH group and the first type PUCCH group may have an intersection or not. When they have an intersection, the second type PUCCH group may be a subset of the first type PUCCH group. In the method for feeding back ACK/NACK provided by the embodiments of the present disclosure, for facilitating the description, it is regarded that the two types of PUCCH groups have no intersection. For example, a PUCCH group consists of unlicensed carriers and includes merely the PUSCH has no intersection with a PUCCH group consists of licensed carriers and includes PUCCH. The embodiments of the present disclosure are also applicable for the cases that they have an intersection.

In some embodiments, the second type PUCCH group may carry merely part of the uplink control information. The remaining uplink control information may be carried by another PUCCH group. In some embodiments, the another PUCCH group may be the first type PUCCH group. In other embodiments, the another PUCCH group may be another second type PUCCH group. For example, in the second type PUCCH group consists of unlicensed carriers, the ACK/NACK information of the unlicensed carriers may be carried by the PUSCH in the PUCCH group, and periodic CSI information of the unlicensed carriers may be carried by PUSCH or PUCCH of another PUCCH group, e.g., carried by the Pcell or pScell transmitting PUCCH or PUSCH of a licensed carrier of another PUCCH group. An example is provided in embodiment 8 of the present disclosure, in which the carrier transmitting the periodic CSI and the carrier transmitting the ACK/NACK of the unlicensed carriers belong to different PUCCH groups.

In the PUCCH group, the value of DAI is counted within the PUCCH group. For example, the base station configures 4 carriers for the UE, wherein CC1~CC2 are licensed carriers and CC3~CC4 are unlicensed carriers, CC3 and CC4 belong to a second type PUCCH group. Thus, the values of DAI of the carriers CC1 and CC2 are counted cumulatively and the values of DAI of the carriers CC3 and CC4 are counted cumulatively. The values of DAI of the two groups are counted individually. In some embodiments, the counting manner of the DAI is configured independently. For example, CC1 and CC2 may be configured with no DAI, a determination is made according to the number of configured carriers when the UE feeds back the HARQ-ACK, e.g., the LTE Rel-12 CA manner. For the CC3 and CC4, a total/counter DAI may be configured, e.g., the LTE Rel-13 CA manner.

Alternatively, in the PUCCH group, the value of the DAI transmitted by the base station is cumulatively counted in multiple PUCCH groups. For example, the base station configures 4 carriers for the UE, wherein CC1~CC2 are licensed carriers, and CC3~CC4 are unlicensed carriers and belong to the second type PUCCH group. Thus, the values of DAI of the four carriers CC1~CC4 are counted cumulatively.

In some embodiments, the uplink carriers for feeding back the uplink control information of the licensed carrier and the unlicensed carrier are different. The HARQ-ACK information of the licensed carrier is transmitted on an uplink carrier of the licensed band, whereas the HARQ-ACK information of the unlicensed carrier is transmitted on an uplink carrier of the unlicensed band or on an uplink carrier of the licensed band when a predefined condition is met. This assumption is applicable in various embodiments of the present disclosure and is not repeated in the following embodiments. However, the present disclosure is not restricted to this assumption.

In the following embodiments, assume that an entity feeding back the HARQ-ACK is a UE, an entity receiving the HARQ-ACK is a base station. The present disclosure is also applicable for other scenarios.

In an existing LTE system, HARQ-ACK feedback is required for PDSCH and PDCCH indicating semi-persistent scheduling (SPS) service. For facilitating the description, the following embodiments describe merely the HARQ-ACK corresponding to the PDSCH. But the present disclosure is applicable for all physical channels requiring HARQ-ACK feedback, not only those having been defined by the current LTE system, but also those will be introduced in new systems.

Embodiment 1

The present disclosure provides a method for feeding back HARQ-ACK information, as shown in FIG. 2. The method includes the following.

In step 201, a UE determines an uplink subframe n+k responsible for HARQ-ACK feedback corresponding to a PDSCH of a downlink subframe n.

The value of k may be determined according to HARQ-ACK timing of existing FDD-FDD and TDD-FDD carrier aggregation. As to the FDD-FDD, the first FDD corresponds to a reference carrier, and the second FDD corresponds to an unlicensed carrier. As to the TDD-FDD, the TDD corresponds to a reference carrier and the FDD corresponds to an unlicensed carrier. The meaning of the FDD corresponding to the unlicensed carrier is that, when determining the timing for the unlicensed band, the assumption of the FDD is applied.

In some embodiments, for the FDD-FDD situation, i.e., the licensed carriers aggregated with the unlicensed carriers are all FDD carriers, for any downlink subframe n of the unlicensed carriers, the value of k of the uplink subframe n+k for feeding back the HARQ-ACK is the same, and is same as the value of k of the aggregated licensed carriers, e.g., k=4.

In some embodiments, for the TDD-FDD situation, i.e., the licensed carriers aggregated with the unlicensed carriers include both FDD carriers and TDD carriers or include merely TDD carriers, it is possible to determine the value of k of the uplink subframe n+k for feeding back the HARQ-ACK of the downlink subframe n of the unlicensed carriers based on a combination of the HARQ-ACK timing of the reference carrier (as shown in Table 2) determined according to the TDD uplink-downlink configuration and the HARQ-ACK timing of the unlicensed carrier based on the FDD assumption (e.g. k=4).

In some embodiments, the reference carrier is Pcell or pScell.

In some embodiments, the reference carrier is a licensed carrier.

For example, the UE is configured with three carriers, wherein CC1 is a licensed carrier, configured as Pcell and is an FDD carrier, i.e., adopting frame structure 1 defined in TS 36.211, CC2 is a unlicensed carrier and is configured as Scell, i.e., adopting frame structure 3 defined in TS 36.211, CC3 is a unlicensed carrier and is configured as Scell, i.e., adopting frame structure 3 defined in TS 36.211. For any downlink subframe n on CC2 or CC3, the value of k of the uplink subframe n+k for feeding back the HARQ-ACK is determined according to the rule of CC1, i.e., k=4.

For another example, the UE is configured with 3 carriers, wherein CC1 is a licensed carriers, configured as Pcell and is a TDD carrier, i.e., adopting frame structure 2 defined by TS 36.211, the uplink-downlink configuration is as shown by configuration 1 of Table 1, DSUUDDSUUD. As such, the timing for the HARQ-ACK feedback corresponds to the values of k corresponding to the uplink-downlink configuration 1 in Table 2, i.e., for downlink subframe #0, the corresponding HARQ-ACK uplink subframe is #7 (k=7), for downlink subframe #1, the HARQ-ACK uplink subframe is #7 (k=6), for downlink subframe #4, the corresponding HARQ-ACK uplink subframe is #8 (k=4), for downlink subframe #5, the corresponding HARQ-ACK uplink subframe is uplink subframe #2 of a next frame (k=7), for downlink subframe #6, the corresponding HARQ-ACK uplink frame is uplink subframe #2 of the next frame (k=6), for downlink subframe #9, the corresponding HARQ-ACK uplink subframe is uplink subframe #3 of the next frame (k=4). CC2 is an unlicensed carrier and is configured as Scell, i.e., adopting frame structure 3 defined by TS 36.211. CC3 is an unlicensed carrier and is configured as Scell, i.e., adopting frame structure 3 defined by TS 36.211. For any downlink subframe n on CC2/CC3, the value of k of the uplink subframe n+k for feeding back the HARQ-ACK is determined according to the rule of CC1, i.e., for downlink subframe #0, the corresponding HARQ-ACK uplink subframe is #7 (k=7); for downlink subframe #1, the corresponding HARQ-ACK uplink subframe is #7 (k=6); for downlink subframe #4, the corresponding HARQ-ACK uplink subframe is #8 (k=4); for downlink subframe #5, the corresponding HARQ-ACK uplink subframe is #2 of next frame (k=7); for downlink subframe #6, the corresponding HARQ-ACK uplink subframe is #2 of next frame (k=6); for downlink subframe #9, the corresponding HARQ-ACK uplink subframe is #3 of next frame (k=4).

In step 202, the UE transmits uplink control information in the uplink subframe n+k on the uplink carrier indicated by the base station.

In some embodiments, the uplink control information includes at least the HARQ-ACK information.

In some embodiments, the uplink carrier indicated by the base station is the Pcell or an unlicensed carrier configured for transmitting the PUCCH.

In some embodiments, the uplink carrier indicated by the base station is the Pcell or an unlicensed carrier determined according to a predefined rule for feeding back the uplink control information.

In some embodiments, indication information for indicating the uplink carrier by the base station is included in DL assignment DCI scheduling the PDSCH, e.g., 1 bit. In some embodiments, new bit(s) may be added in the DL assignment DCI scheduling the PDSCH. In some embodiments, existing bit(s) in the DL assignment DCI scheduling the PDSCH may be re-defined, e.g., TPC bits, at least one combination of the bits may be used for indicating the carrier, e.g., whether the transmission is on the Pcell/pScell, or is on the unlicensed carrier. The re-definition of the existing bit(s) may be configured by the base station. For example, the base station may dynamically indicate which carrier is responsible for the transmission. Thus, three kinds of combinations of the TPC bits may be used for indicating the carrier to transmit ACK/NACK and the corresponding resources on that carrier. One combination of the TPC bits may be used for indicating that there is no carrier fallback. In some embodiments, the indication information is included in the common DCI.

Referring to the example of step 201, the UE is configured with 3 carriers, CC1 is a licensed carrier and is Pcell, CC2/CC3 are unlicensed carriers and CC2 is pScell. Suppose that the uplink control information of CC1 is merely fed back on CC1, and the uplink control information of CC2/CC3 is fed back on CC2. Thus, the indication information of the base station is 1 bit, indicating that whether the HARQ-ACK information is fed back on the Pcell (CC1) or the pScell (CC2).

In some embodiments, the uplink carrier indicated by the base station is not restricted to the Pcell. For example, the base station may semi-statically configure two uplink carriers, e.g., CC2 and CC3. The base station indicates that the HARQ-ACK is fed back on which carrier via physical layer signaling. For another example, the base station may semi-statically configure a fallback uplink carrier corresponding to a second type PUCCH group. The base station dynamically indicates via physical layer signaling whether the HARQ-ACK is fed back on the fallback carrier or the corresponding uplink carrier of the second type PUCCH group. Suppose that the base station configures 4 carriers for the UE, wherein carriers CC1 and CC2 are licensed carriers, CC1 is Pcell, CC3 and CC4 are unlicensed carriers, CC3/CC4 belong to a second type PUCCH group, CC2 is a fallback uplink carrier for the second type PUCCH group. The base station is able to dynamically indicate whether the UE should transmit the HARQ-ACK on CC2 or CC3/CC4.

In some embodiments, the UE determines, according to the HARQ-ACK feedback timing determined based on the reference carrier and the related art, bit length and bit sequence of the HARQ-ACK feedback. Or, the UE may determine the bit length and bit sequence of the HARQ-ACK feedback according to the method provided by embodiment 3.

In some embodiments, if the UE determines the bit length of the HARQ-ACK feedback according to the HARQ-ACK feedback timing determined based on the reference carrier, suppose that the DAI transmitted by the base station is counted individually for different PUCCH groups, when carriers of different PUCCH groups have an intersection, e.g., the second type PUCCH group is a subset of the first type PUCCH group, the total/counter DAI of all carriers in the second type PUCCH group are counted cumulatively, and the total/counter DAI of carriers within the same first type PUCCH group but not included in the second type PUCCH group are counted cumulatively. The two types of DAI are counted independently.

In some embodiments, when transmitting the uplink control information on the carrier indicated by the base station, the UE determines an uplink transmission power according to power control parameters of the carrier.

In some embodiments, when transmitting the uplink control information on the carrier indicated by the base station, the UE needs to determine positions of the resources for transmitting the uplink control information on the carrier. For example, the UE is configured with 3 carriers, CC1 is a licensed carrier and is Pcell, CC2/CC3 are unlicensed carriers and belong to a second type PUCCH group. Suppose that the uplink control information of the CC1 is transmitted on merely CC1. If PUSCH is transmitted on CC2, the uplink control information of CC2/CC3 is fed back on CC2; otherwise, the uplink control information of CC1/CC2/CC3 is fed back on CC1. If the carrier indicated by the base station is CC1, the UE determines, according to the bit length of the uplink control information to be fed back on CC1, a PUCCH format for feeding back the uplink control information on CC1 and transmission resources for the corresponding PUCCH format. For example, if the carrier indicated by the base station is a carrier of the second type PUCCH group, the UE feeds back the HARQ-ACK of CC1 on CC1 and feeds back the HARQ-ACK of CC2 and CC3 on CC2 on which PUSCH is transmitted. The PUCCH on CC1 is of PUCCH format 1a/1b and the PUCCH resources are determined based on CCEs of the PDCCH on CC1. If the carrier indicated by the base station is CC1, the UE feeds back the HARQ-ACK of CC1, CC2 and CC3 on CC1 adopting the PUCCH format 3, the PUCCH resources are indicated by ARI in the DL assignment of CC2/CC3.

In this embodiment, the manner that the base station informs the UE on which carrier the HARQ-ACK is to be fed back has the following advantages: the base station is able to determine, according to the overhead of the uplink control information on the licensed carrier, whether to let the UE to transmit on the licensed carrier such as the Pcell to feed back the HARQ-ACK of the unlicensed carrier. For another example, the base station is able to determine, according to a service situation or CCA situation of the unlicensed carrier, whether to schedule downlink transmission on the unlicensed carrier in the subframe in which HARQ-ACK may be fed back, so as to determine whether to let the UE to transmit on the licensed carrier. For example, if the base station determines to schedule the downlink transmission on the unlicensed carrier in a corresponding HARQ-ACK subframe, the base station may indicate the UE to feed back the HARQ-ACK on the Pcell in the corresponding subframe.

Several application scenarios are provided to make the solution of the present disclosure easier to be understood. As shown in FIG. 3, UE 1 is configured with 3 carriers. CC1 is a licensed carrier, configured as PCell and is a TDD carrier, the uplink-downlink configuration 1 is adopted. CC2/CC3 are unlicensed carriers, CC2 is a pScell. The base station transmits PDSCH for UE 1 in downlink subframes 0, 4, 5, 6 and 9 of CC1. Then UE 1 feeds back ACK/NACK in uplink subframes 7 and 8 of the same frame and uplink subframes 2, 2, 3 of the next frame. The base station does not seize the channel in downlink subframes 0~3 of CC2, passes the CCA check in subframe 4 and occupies the channel for downlink transmission till subframe 8, performs a CCA check again and occupies the channel from subframe 9 to subframe 2 of the next frame. In subframes 4, 5 and 9, the base station transmits the PDSCH for UE 1. The UE performs uplink transmission in uplink subframes 2 and 3. The base station does not seize the channel in downlink subframes 0~3 on CC3, passes the CCA check in subframe 4 and occupies the channel for downlink transmission till subframe 6, performs a CCA check again and occupies the channel from subframe 9 to subframe 2 of a next frame. In subframes 4, 5 and 9, the base station transmits PDSCH for UE 1. It can be seen that, if the HARQ-ACK timing of CC1 is applied for CC2/CC3, the HARQ-ACK for the PDSCH transmitted in subframe 4 of CC2 and CC3 should be fed back in subframe 8. However, subframe 8 of CC2 is a downlink subframe and cannot transmit the HARQ-ACK. Therefore, the base station may inform UE 1 to feed back the HARQ-ACK of CC1, CC2 and CC3 in the subframe 8 on CC1. For the downlink subframe 5, according to the HARQ-ACK timing of CC1, the HARQ-ACK of the PDSCH transmitted in the downlink subframe 5 of CC2 and CC3 should be fed back in subframe 2 of the next frame. Subframe 2 of CC2 is an uplink subframe. Therefore, the base station may inform UE 1 to feed back the HARQ-ACK of CC2 and CC3 in the subframe 2 of the next frame on CC2. It should be noted that, CC2 and CC3 do not have fixed uplink-downlink configuration. The base station may determine the uplink-downlink configuration according to service amount and busy/idle situation of the channel. In this example, CC2 has a large amount of downlink services. Therefore, the base station may configure less uplink subframes and more downlink subframes for CC2, so as to transmit more downlink services on CC2. At this time, the HARQ-ACK feedback may be dynamically allocated to the Pcell for transmission. For another example, the base station wants to ensure that the HARQ-ACK for a data packet transmitted in downlink subframe 4 on CC3 can be fed back in time. However, the time cannot be ensured if the HARQ-ACK is transmitted on CC2, e.g., UE 1 cannot pass the CCA check if the channel is occupied by WiFi in subframe 8. Therefore, the base station may dynamically schedule UE 1 to transmit the HARQ-ACK on the Pcell.

Embodiment 2

The present disclosure provides a method for feeding back HARQ-ACK information. The method includes the following.

In step 401, a UE determines an uplink subframe n+k for feeding back HARQ-ACK corresponding to a PDSCH in downlink subframe n according to time information dynamically indicated by a base station.

In step 402, the UE transmits uplink control information in the uplink subframe n+k on an uplink carrier indicated by the base station.

Different from embodiment 1, in step 401, the uplink subframe for transmitting the HARQ-ACK determined by the UE is not predefined or determined based on a combination of the configured HARQ-ACK timing of a reference carrier and the HARQ-ACK timing of the unlicensed carrier, but is determined according to physical layer signaling transmitted by the base station.

In some embodiments, the physical layer signaling is DL DCI of DL assignment or common DCI.

In some embodiments, the physical layer signaling is the TPC bits in the DL DCI of the DL assignment, for indicating the uplink subframe for feeding back the HARQ-ACK. For example, in a second type PUCCH group, there is no PUCCH, and the HARQ-ACK is carried by the PUSCH. Therefore, the TPC bits in the D1 DCI are not used for power control of the PUCCH and also not used for indicating resources (ARI) of the PUCCH. The TPC bits may be used for indicating the time information for feeding back the HARQ-ACK. Likewise, the TPC bits may be used for indicating, e.g., resource of aperiodic SRS.

In some embodiments, the base station may indicate the uplink carrier according to the method provided by embodiments of the present disclosure or the related art.

Embodiment 3

The present disclosure provides a method for feeding back HARQ-ACK information, as shown in FIG. 5. The method includes the following.

In step 501, a UE determines an uplink subframe n+k for feeding back HARQ-ACK corresponding to a PDSCH in a downlink subframe n.

In some embodiments, the UE may determine the uplink subframe n+k according to the method provided by step 201 of embodiment 1 or the method provided by step 401 in embodiment 2.

In step 502, the UE determines uplink carrier information for the uplink control information including at least the HARQ-ACK information transmitted in uplink subframe n+k.

In some embodiments, the uplink carrier information indicates on which uplink carrier the uplink control information containing at least the HARQ-ACK information is transmitted.

In some embodiments, the uplink carrier includes at least a first uplink carrier and a second uplink carrier.

In some embodiments, the first uplink carrier is an unlicensed carrier.

In some embodiments, the first uplink carrier is an uplink carrier available for transmitting PUCCH in a PUCCH group.

In some embodiments, the first uplink carrier is an uplink carrier determined according to a predefined rule and available for transmitting PUSCH containing UCI in a second type PUCCH group.

In some embodiments, the second uplink carrier is a licensed carrier.

In some embodiments, the second uplink carrier is a Pcell.

In some embodiments, the second uplink carrier is the Pcell and is a licensed carrier.

In some embodiments, the second uplink carrier is predefined, e.g., predefined to be the Pcell in standards.

In some embodiments, the second uplink carrier is an uplink carrier available for transmitting PUCCH in a PUCCH group.

In some embodiments, the second uplink carrier is an uplink carrier available for transmitting UCI in the first type PUCCH group.

In some embodiments, the second uplink carrier is semi-statically configured by the base station, e.g., the base station may configure an uplink carrier on the licensed band for each second type PUCCH group. The uplink carrier on the licensed band is available for transmitting PUCCH and the PUCCH carries the HARQ-ACK information of the carriers in the corresponding second type PUCCH group. In some embodiments, the HARQ-ACK information of the licensed carrier is transmitted on the Pcell/Scell of the first type PUCCH group where it belongs to.

In some embodiments, the UE may perform a CCA check on the first uplink carrier before the uplink subframe n+k, if the CCA check is passed, the UE determines to transmit the HARQ-ACK on the first uplink carrier; otherwise, the UE transmits the HARQ-ACK on the second carrier. It should be noted that, the description herein does not consider the situation that the base station transmits a UL grant but the UE fails to detect the UL grant. However, in the case that the UE fails to detect the UL grant, the UE certainly cannot transmit the corresponding PUSCH. In this case, if there is no corresponding PUSCH transmission, the UE transmits the HARQ-ACK on the second carrier.

In some embodiments, the UE may determine whether to transmit the HARQ-ACK on the first or second carrier according to the information indicating the uplink carrier for transmitting the uplink control information transmitted by the base station. The indication information may be transmitted according to the method provided by embodiment 1 or 2.

In some embodiments, the UE may determine whether the HARQ-ACK is fed back on the first or the second uplink carrier according to a total number of bits of the uplink control information can be fed back on the second uplink carrier. For example, suppose that the total number of bits of the HARQ-ACK of the downlink carriers of the PUCCH group corresponding to the second uplink carrier is PUCCH format X, and the sum of the number of bits of the HARQ-ACK should have been fed back on the first uplink carrier and the number of bits of the HARQ-ACK of the downlink carriers of the PUCCH group corresponding to the second uplink carrier is PUCCH format Y. If format X and format Y are same, the UE may transmit on the second carrier to transmit the HARQ-ACK when it cannot be transmitted on the first carrier. If format X and format Y are different, the UE can fed back the HARQ-ACK on merely the first carrier or give up the feedback of the corresponding HARQ-ACK. For another example, PUCCH format X and format Y are same, but the number of PRBs, e.g., 4 PRBs allocated by the base station for the PUCCH format X, is insufficient for carrying the sum of the number of bits of the HARQ-ACK which should have been fed back on the first uplink carrier and the number of bits of the HARQ-ACK of the downlink carriers of the PUCCH group corresponding to the second uplink carrier, e.g., 8 PRBs, the UE is merely able to feed back the HARQ-ACK on the first carrier or give up the feedback of the corresponding HARQ-ACK.

In some embodiments, the UE determines the uplink carrier for transmitting the uplink control information, and further determines the resources of the uplink carrier for transmitting the uplink control information. The resources may be determined according to one or more of the following manners.

Manner 1: if the UE transmits the HARQ-ACK on the second uplink carrier, the PUCCH resources may be indicated by the TPC in the DL assignment of downlink carriers in the second type PUCCH group that the first uplink carrier belongs to (ARI).

For example, if the base station schedules merely the downlink carrier Pcell in the first type PUCCH group that the second uplink carrier belongs to, the TPC in the DL assignment scheduling the downlink carrier Pcell merely indicates the power control information but does not indicate PUCCH resource information, i.e., not ARI. Thus, when the UE transmits, on the second uplink carrier, the HARQ-ACK of the downlink carrier Pcell in the first type PUCCH group and the HARQ-ACK of the downlink carriers of the second type PUCCH group that the first uplink carrier belongs to, the utilized PUCCH resources are indicated by the TPC in the DL assignment of the downlink carriers of the second type PUCCH group that the first uplink carrier belongs to (ARI).

For another example, the TPC in the DL assignment of the downlink carriers in the first type PUCCH group that the second uplink carrier belongs to may indicate the PUCCH resources when merely the HARQ-ACK of the downlink carriers of the first type PUCCH group that the second uplink carrier belongs to is fed back, whereas the TPC in the DL assignment of the downlink carriers in the second type PUCCH group that the first uplink carrier belongs to indicates the PUCCH resources when the HARQ-ACK of the downlink carriers in the first type PUCCH group that the second uplink carrier belongs to and the HARQ-ACK of the downlink carriers of the second type PUCCH group that the first uplink carrier belongs to are fed back on the second uplink carrier.

Manner 2: when the UE transmits HARQ-ACK on the second uplink carrier, the PUCCH resources may be indicated by the TPC in the DL assignment of the downlink carriers in the first type PUCCH group that the second uplink carrier belongs to (ARI).

For example, the TPC in the DL assignment of the downlink carriers in the first type PUCCH group that the second uplink carrier belongs to is able to indicate both the PUCCH resources when merely the HARQ-ACK of the downlink carriers in the first type PUCCH group that the second uplink carrier is fed back, and the PUCCH resources when the HARQ-ACK of the downlink carriers of the first type PUCCH group that the second uplink carrier belongs to and the HARQ-ACK of the downlink carriers in the second type PUCCH group that the first uplink carrier belongs to are fed back. The TPC in the DL assignment of the downlink carriers in the second type PUCCH group that the first uplink carrier belongs to may be used for indicating other information, e.g., indicating time information for feeding back the HARQ-ACK as mentioned in other embodiments, or indicating carrier information, or indicating information about aperiodic SRS, etc.

Manner 3: when the UE transmits the HARQ-ACK on the second uplink carrier, the PUCCH resources may be indicated by the TPC in the DL assignment of the downlink carriers in the second type PUCCH group that the first uplink carrier belongs to and the TPC in the DL assignment of the downlink carriers in the first type PUCCH group that the second uplink carrier belongs to (ARI). The ARI information of the two kinds of TPC are same.

In some embodiments, when the UE transmits HARQ-ACK on the second uplink carrier, the PUCCH format is determined according to the number of bits of the uplink control information can be transmitted, and the resources may be indicated according to the PUCCH format and the TPC in the DL assignment of the downlink carriers of the second type PUCCH group that the first uplink carrier belongs to and/or the TPC in the DL assignment of downlink carriers of the first type PUCCH group that the second uplink carrier belongs to.

In some embodiments, when the UE transmits the HARQ-ACK on the second uplink carrier, the resources for transmitting the uplink control information on the second uplink carrier may be determined according to the method provided by embodiment 1 or according to the related art.

In step 503, according to the uplink carrier transmitting the uplink control information including at least the HARQ-ACK information, the HARQ-ACK bits are determined and are transmitted on the uplink carrier.

Furthermore, if the HARQ-ACK information is transmitted on the first uplink carrier, the transmitted HARQ-ACK information includes merely the HARQ-ACK information corresponding to the PDSCH of the downlink carriers in the PUCCH group that the first uplink carrier belongs to. If the HARQ-ACK information is transmitted on the second uplink carrier, the transmitted HARQ-ACK information includes both the HARQ-ACK information corresponding to the PDSCH of the downlink carriers of the PUCCH group where the first uplink carrier belongs to and the HARQ-ACK information corresponding to the PDSCH of the downlink carriers of the PUCCH group that the second uplink carrier belongs to, and so on.

In some embodiments, the UE sorts the HARQ-ACK bits of the PDSCH of the downlink carriers of the PUCCH group that the first uplink carrier belongs to and the HARQ-ACK bits of the PDSCH of the downlink carriers of the PUCCH group that the second uplink carrier belongs to according to a predefined order. For example, it is possible to sort according to carrier indexes of the first uplink carrier and the second uplink carrier. For example, the HARQ-ACK corresponding to an uplink carrier with a small Scellindex is placed in the front, and the HARQ-ACK corresponding to an uplink carrier with a large Scellindex is placed behind. For another example, if the PUCCH group that the second uplink carrier belongs to includes a Pcell, the HARQ-ACK bits corresponding to the downlink carriers of the PUCCH group are placed in the front, and the HARQ-ACK bits of the PDSCH of the downlink carriers in the PUCCH group that the first uplink carrier belongs to are placed behind. When determining the HARQ-ACK bit length, the UE may use the following manner 1 or 2.

Manner 1: when determining the HARQ-ACK bits of the carrier group placed in the front, the UE determines the number of the HARQ-ACK bits according to a maximum number of bits can be fed back, i.e., the same as the mechanism in LTE Release 12, which determines the number of bits according to the number of configured carriers and information indicated by UL DAI/DL DAI, but not according to the number of PDSCHs (such as total DAI) actually transmitted by the base station. In other words, the base station configures that the number of HARQ-ACK bits of the carrier group placed in the front is determined according to the number of configured carriers, i.e., the HARQ-ACK transmission manner of CA in Rel-12. As to the HARQ-ACK bits of the carrier group placed in the last, if the base station configures that the HARQ-ACK bits are determined according to the number of PDSCHs actually transmitted, the UE determines the number of bits according to the number of PDSCHs actually transmitted (such as total DAI). For example, the HARQ-ACK bits of the PUCCH group that the second uplink carrier belongs to are placed in the most front, suppose that it is a FDD system, the PUCCH group includes 2 carriers, each carrier corresponds to 2 HARQ-ACK bits. Thus, no matter how many carriers that the base station schedules, the UE feeds back 4 bits. If the UE detects the PDSCH and the detection is correct, the UE feeds back an ACK. If the detection is error or the UE fails to detect the PDSCH, the UE feeds back an NACK. This manner has an advantage that, if the UE fails to detect the PDSCH in the PUCCH group that the second uplink carrier belongs to but does not aware of this, it does not affect the UE when arranging the HARQ-ACK bits of the PUCCH group that the first uplink carrier belongs to, which avoids misunderstanding of the base station and the UE about the bit length and bit arrangement of the HARQ-ACK.

In some embodiments, the number of configured carriers refers to the number of carriers configured in one PUCCH group.

As shown in FIG. 6, UE 1 is configured with 5 carriers, wherein CC1 is a licensed carrier and is a Pcell, CC2 is a licensed carrier and belongs to the same PUCCH group with CC1. These two carriers are both FDD carriers, and the transmission mode (TM) of each of them is to support up to two transmission blocks. CC1 is the second uplink carrier. CC3~CC5 are unlicensed carriers and belong to the same PUCCH group. The transmission mode (TM) of each of them is to support up to 2 transmission blocks. CC3 is a pScell and is the first uplink carrier. Suppose that the base station transmits total DAIs. The total DAIs within different PUCCH groups are independent each other. Total DAI=1 is transmitted in the DL DCI on CC1, denoting that merely one PDSCH is transmitted in the second type PUCCH group. Total DAI=2 is transmitted in the DL DCI on CC3 and CC4, denoting that two PDSCHs are transmitted in the first type PUCCH group. Suppose that UE 1 receives the PDSCH on CC1, CC3 and CC4 in subframe 0, UE 1 determines that HARQ-ACK information needs to be fed back in subframe 4. Thus, before subframe 4, UE 1 performs a CCA check on CC3. If the CCA check is passed, UE 1 feeds back the HARA-ACK of CC3 and CC4 on CC3, the number of HARQ-ACK bits is 4; and feeds back the HARQ-ACK of CC1 on CC1, the number of HARQ-ACK bits is 2. However, if the CCA check on CC3 fails, the feedback for the PDSCH of CC1, CC3 and CC4 are transmitted on CC1. At this time, when arranging the HARQ-ACK bits, the UE needs to arrange the HARQ-ACK bits of CC1 and CC2 in the front and then the HARQ-ACK bits of CC3~CC5. In other words, the UE feeds back 4+4 bits, wherein the former 4 bits are the HARQ-ACK bits of CC1 and CC2, the latter 4 bits are HARQ-ACK bits of CC3 and CC4. Although UE 1 correctly receives the total DAI of CC1 and is able to determine that there is merely one PDSCH in the second type PUCCH group, UE 1 still needs to determine the number of bits to be fed back according to the number of carriers CC1+CC2, wherein the ACK/NACK of CC1 is generated according to a CRC check result, and CC2 corresponds to NACK.

Manner 2: if the UE determines in step 502 to transmit the uplink control information containing the HARQ-ACK on the second uplink carrier, the HARQ-ACK bits of all carrier groups is determined according the maximum number of bits can be fed back, i.e., the same as the mechanism in LTE Release 12, which determines the number of bits according to the number of configured carriers and/or information indicated by UL DAI/DL DAI, but not according to the number of PDSCHs actually transmitted by the base station (such as total DAI). However, once the UE determines to feed back on the first uplink carrier, the number of bits is determined according to the number of PDSCHs (such as total DAI) actually transmitted by the base station.

In some embodiments, the UE assumes that the total DAI and/or counter DAI transmitted by the base station are counted individually in each PUCCH group.

In some embodiments, the number of configured carriers refers to the number of carriers configured in one PUCCH group.

The above shows an example for determining the number of bits based on a FDD-FDD scenario. The embodiments of the present disclosure are also applicable for the TDD-FDD scenario, merely the corresponding FDD operations need to be mapped to the TDD operations. For example, in step 503, if the HARQ-ACK is transmitted on the first uplink carrier, the number of bits is determined according to the number of PDSCHs (e.g., total DAI) actually transmitted by the base station according to current TDD system. If the HARQ-ACK is transmitted on the second uplink carrier, the HARQ-ACK of the second type PUCCH group is determined according to the maximum number of bits can be fed back according to the current TDD system.

In another implementation of the this embodiment, if the uplink carrier feeding back the HARQ-ACK corresponding to the first uplink carrier may be the first uplink carrier or the second uplink carrier, e.g., if the determination is made based on the indication of the base station or a CCA check result of the UE as described above, the HARQ-ACK feedback mode of the UE is configured to be determined according to the maximum number of PDSCHs can be transmitted by the base station, i.e., the HARQ-ACK feedback manner of carrier aggregation in LE Release-12. As such, no matter that the UE feeds back the HARQ-ACK on the first or the second carrier, the number of HARQ-ACK bits is always determined according to the maximum number of PDSCHs can be transmitted by the base station.

Embodiment 4

The present disclosure provides a method for feeding back HARQ-ACK information. As shown in FIG. 7, the method includes the following.

In step 701, a UE determines a first uplink subframe n+k responsible for HARQ-ACK feedback of PDSCH(s) of a downlink subframe n, and determines an uplink control information feedback window starting from the first uplink subframe.

In some embodiments, the UE may determine the uplink subframe n+k according to the method as described in step 201 of embodiment 1 or the method described in step 401 of embodiment 2.

The uplink control information feedback window may be semi-statically configured by the base station. It is a time window starting from the first uplink frame and having a length of N. In some embodiments, the length N of the feedback window may be 1, i.e., the UE has merely one opportunity to attempt to transmit the uplink control information. In some embodiments, the length N of the feedback window may be an integer larger than 1. When determining the length of the feedback window, a tradeoff between delay of the uplink control information and a transmission probability of the uplink control information may be considered.

In some embodiments, the UE may transmit the uplink control information in a first idle uplink subframe in the feedback window. For different first uplink subframes, the feedback windows have the same length, as shown in FIG. 8(a). If the subframe 4 or subframe 5 is the first uplink subframe, the length of the feedback window is 4. Thus, the UE may transmit at least uplink control information corresponding subframe 4 in subframes 4~7 or transmit at least uplink control information corresponding subframe 5 in subframes 5~8. It should be noted that, since the length of uplink/downlink burst on the unlicensed carrier is variable, it is possible that there is no available uplink subframe within the feedback window, e.g., it has been switched to downlink subframes. The UE is able to determine that the subframes in the feedback window cannot be used for uplink transmission based on explicit signaling indication, e.g., at least indication of ending of uplink burst indicated by the base station via common DCI, or other information indicating the uplink/downlink burst. In another manner, instead of based on the explicit signaling indication, the UE is able determine whether subframes within the feedback window can be used for uplink transmission via blind detection, e.g., CCA check. Thus, although the same feedback window length is configured for each uplink subframe, the number of subframes actually can be used for uplink transmission is different, as shown in FIG. 8(b). When subframe 4 is the first subframe, the length of the feedback window is 4. The UE may transmit at least the uplink control information corresponding to subframe 4 in subframes 4~7. When subframe 5 is the first subframe, although the configured length of the feedback window is 4, since subframe 8 is a downlink subframe, the subframes actually available for the UE is subframes 5~7. It can be seen that, the defined feedback window determines a maximum delay of the HARQ-ACK fed back by the UE.

The uplink control information feedback window may be dynamically configured by the base station. The start point is still the first uplink subframe. But the length of the feedback window may be dynamically indicated by the base station, e.g. via DL assignment scheduling PDSCH or common DCI, or via other dedicated DCI.

In step 702, the UE determines a position of a subframe in which uplink control information containing at least HARQ-ACK information can be transmitted within the uplink control information feedback window.

In some embodiments, the subframe for transmitting the uplink control information must be within the feedback window. The feedback window starts from the first uplink subframe n+k determined in step 701, then follows a second uplink subframe, a third uplink subframe, until the end of the feedback window.

In some embodiments, the UE may perform a CCA check before the first uplink subframe. If the CCA check succeeds, the UE determines to transmit HARQ-ACK in the first uplink subframe. Otherwise, the UE performs a CCA check before the second uplink subframe. If the CCA check succeeds, the UE determines to transmit HARQ-ACK in the second uplink subframe. The process proceeds until the last uplink subframe in the feedback window. If the CCA check is not successful until the last uplink subframe, the UE gives up the transmission of the uplink control information, or attempts to transmit the uplink control information on another carrier, which is not restricted in the present disclosure.

It can be seen from the above that, if the CCA check by the UE is failed in the uplink subframe $X_1$ but succeeds in another subframe (subframe $X_2$) in the feedback window, and the subframe $X_2$ also has corresponding uplink control information to be transmitted, both the uplink control information of the subframe $X_2$ and the uplink control information of the uplink subframe $X_1$ are transmitted in the uplink subframe $X_2$. The detailed operation may be seen in step 703.

In step 703, the UE determines the HARQ-ACK bits to be transmitted according to the position of the subframe in which the uplink control information containing at least the HARQ-ACK information is transmitted, and transmits the uplink control information containing at least the HARQ-ACK information in the subframe.

Furthermore, if the HARQ-ACK information is transmitted in the first uplink subframe, the transmitted HARQ-ACK information includes merely the HARQ-ACK information corresponding to the PDSCH(s) of the downlink carriers corresponding to the first uplink subframe. If the HARQ-ACK information is transmitted in the second uplink subframe, the transmitted HARQ-ACK information includes both the HARQ-ACK information corresponding to the PDSCH(s) of the downlink carriers corresponding to the first uplink subframe and the HARQ-ACK information corresponding to the PDSCH(s) of the downlink carriers corresponding to the second uplink carrier, and so on.

In some embodiments, the PDSCH(s) of the downlink carriers corresponding to the uplink subframe X may be the PDSCHs on all downlink carriers in all downlink subframes in the time-frequency bundling window corresponding to the uplink subframe X. The length of the time-frequency bundling window may be 1, i.e., one uplink subframe corresponds to merely one downlink subframe. The length of the time-frequency bundling window may be determined according to conventional TDD uplink-downlink configuration (Table 1, Table 2). The length of the time-frequency bundling window may also be determined according to a newly-defined uplink-downlink configuration. The time-frequency bundling window may also be determined according to an HARQ-ACK feedback time dynamically indicated by the base station, e.g., the base station may indicate via DL assignment that the HARQ-ACK corresponding to the downlink subframe n is expected to be fed back in the uplink subframe n+k, thus it can be determined how many downlink subframes correspond to the uplink subframe n+k.

In some embodiments, according to a predefined order, the UE sorts the HARQ-ACK of the PDSCH(s) of the downlink carriers corresponding to the first uplink subframe, and/or sorts the HARQ-ACK of the PDSCH(s) of downlink carriers corresponding to the first uplink subframe and the HARQ-ACK of PDSCH(s) of downlink carriers corresponding to the second uplink subframe, and so on, and/or sorts the HARQ-ACK of PDSCH(s) of downlink carriers corresponding to the first uplink carrier until the HARQ-ACK of PDSCH(s) of downlink carriers corresponding to the last uplink subframe in the feedback window.

In some embodiments, the UE sorts the HARQ-ACK bits of PDSCHs of downlink carriers corresponding to different uplink subframes according to the sequence of the uplink subframes. For example, when sorting the HARQ-ACK of the PDSCH(s) of downlink carriers corresponding to the first uplink subframe and that of the second uplink subframe, the HARQ-ACK of the PDSCH(s) of downlink carriers corresponding to the first uplink subframe is arranged in the front, and the HARQ-ACK of the PDSCH(s) of downlink carriers corresponding to the second uplink subframe is placed behind. When the UE arranges the HARQ-ACK bits, the following manner 1 or manner 2 may be adopted.

Manner 1: in some embodiments, the UE assumes that a total DAI and/or counter DAI transmitted by the base station are counted individually in the downlink subframes within respective time-frequency bundling window corresponding to the respective uplink subframe X. For example, as shown in FIG. 9, if the first uplink subframe is respectively subframe 4, 5, 6, and 7, the length of the time-frequency windows respectively corresponding to the first uplink subframes are all 1, the corresponding downlink subframe is respectively 0, 1, 2, and 3. Thus, the total DAI and counter DAI in the DL assignment in each of these downlink subframes is counted individually. For facilitating the description, FIG. 9 merely shows the total DAI, the same applies to the counter DAI.

When the UE feeds back the HARQ-ACK bits in uplink subframe X, suppose that the HARQ-ACK bits includes the HARQ-ACK bits respectively corresponding to uplink subframes $X_1, X_2, \ldots$ and $X_n$. As such, the number of HARQ-ACK bits corresponding to the uplink subframe $X_n$ is determined according to the number of PDSCH(s) actually transmitted (e.g. total DAI), whereas the number of HARQ-ACK bits corresponding to the uplink subframes $X_1, X_2, \ldots$ and $X_{n-1}$ should be determined according to the maximum number of bits can be fed back, i.e. the same as the mechanism in LTE Release 12, in which the number of bits is determined according to the number of configured carriers and/or information indicated in UL DAI/DL DAI, but not according to the number of PDSCH(s) actually transmitted by the base station (e.g., total DAI).

In some embodiments, after the UE successfully transmits the HARQ-ACK bits corresponding to a downlink subframe, the HARQ-ACK bits having been transmitted will not be transmitted in a subsequent uplink subframe.

In some embodiments, the number of configured carriers refers to the number of carriers configured in one PUCCH group.

As shown in FIG. 10, suppose that a downlink burst includes subframes 0~3, an uplink burst includes subframes 4~7, and a next downlink burst including subframes 8~10. UE 1 is configured with 4 CCs, CC0 is a licensed carrier and is configured as a Pcell, CC1~CC3 are unlicensed carriers in the same PUCCH group, CC1 is a pScell for feeding back the HARQ-ACK of CC1~CC3, and belongs to a PUCCH group different from CC0. For facilitating the description, the description is provided merely with respect to CC1~CC3 but not to CC0. As to CC0, the feedback may be performed according to a conventional method. Suppose that the transmission modes of CC1~CC3 are all to support up to 2 transmission blocks. In downlink subframe 0, the base station transmits PDSCH for UE 1 on CC1~CC3. In downlink subframe 1, the base station transmits PDSCH for UE 1 on CC1. In downlink subframe 3, the base station transmits PDSCH for UE 1 on CC1 and CC3. Thus, the base station transmits total DAI=3 in subframe 0, transmits total DAI=2 in subframe 1, and transmits total DAI=2 in subframe 3. The first uplink subframe corresponds to downlink subframe 0 is subframe 4, the feedback window includes subframes 4~7. The first uplink subframe corresponds downlink subframe 1 is subframe 5, and the feedback window includes subframes 5~8. The first uplink subframe corresponds downlink subframe 3 is subframe 7, and the feedback window includes subframes 7~10. However, since the subframes 8~10 are downlink subframes of a new downlink burst, the effective feedback windows respectively include subframes 4~7, subframes 5~7 and subframe 7. Hereinafter, a detailed description is provided with reference to the following situations. It should be noted that the processing is similar for other situations.

If a CCA check performed by UE 1 before uplink subframe 4 succeeds, UE 1 transmits 6 HARQ-ACK bits for downlink subframe 0 in uplink subframe 4.

If a CCA check performed by UE 1 before uplink subframe 4 is failed, but the CCA check in uplink subframe 5 succeeds, UE 1 transmits 6 HARQ-ACK bits for downlink subframe 0 and transmits 2 HARQ-ACK bits for downlink subframe 1 in uplink subframe 5, a total of 8 bits.

If a CCA check performed by UE 1 before uplink subframes 4 and 5 are both failed, but the CCA check in subframe 6 succeeds, UE 1 transmits 6 HARQ-ACK bits of downlink subframe 0 and 2 HARQ-ACK bits of downlink subframe 1 in uplink subframe 6, a total of 8 bits.

If the CCA check performed by UE 1 before uplink subframes 4 and 5 are both failed, but the CCA check in subframe 6 succeeds and the CCA check before uplink subframe 7 succeeds, UE 1 transmits 6 HARQ-ACK bits of downlink subframe 0 and 2 HARQ-ACK bits of downlink subframe 1 in uplink subframe 6, a total of 8 bits. UE 1 transmits in uplink subframe 7 the HARQ-ACK of downlink subframes 2 and 3, a total of 6+4=10 bits. It should be noted that, although UE 1 does not detect the DL DCI in downlink subframe 2, UE 1 still needs to generate 6 HARQ-ACK bits for the 3 carriers, and then arranges the 4 HARQ-ACK bits of subframe 3, so as to avoid that the dislocation of the HARQ-ACK bits of subframe 3 due to UE 1 failing to detect the PDSCH transmitted by the base station in subframe 2. It should also be noted that, since UE 1 has transmitted the HARQ-ACK bits of downlink subframes 0 and 1 in uplink subframe 6, UE 1 does not transmit the HARQ-ACK bits of downlink subframes 0 and 1 again when transmitting HARQ-ACK bits in uplink subframe 7.

If the CCA checks performed by UE 1 before uplink subframe 6 are all failed but the CCA check in uplink subframe 7 succeeds, UE 1 transmits in uplink subframe 7, 6 HARQ-ACK bits of downlink subframe 0, 6 HARQ-ACK bits of downlink subframe 1, 6 HARQ-ACK bits of downlink subframe 2, and 4 HARQ-ACK bits of downlink subframe 3, a total of 22 bits.

Manner 2: in some embodiments, the UE assumes that the values of total DAI and/or counter DAI transmitted by the base station are determined cumulatively for downlink subframes in all time-frequency bundling windows corresponding to all uplink subframes in the uplink control information feedback window.

Alternatively, it may be regarded that, a new time-frequency bundling window is defined. It starts from the first subframe in the time-frequency bundling window corresponding to the first uplink subframe in the feedback window, and ends at the last subframe in the time-frequency bundling window corresponding to the last uplink subframe in the feedback window.

When receiving the total DAI and/or counter DAI, the UE assumes that the total DAI and/or counter DAI indicates a cumulative number of PDSCHs transmitted by the base station within all time-frequency windows from the first downlink subframe of the first time-frequency bundling window determined by the base station to the subframe in which the UE receives the total DAI and/or counter DAI. In some embodiments, the UE may regard that the value of the total DAI and/or counter DAI is determined cumulatively from the first downlink frame in which the total DAI and/or counter DAI is received to the current downlink subframe in which the UE receives the total DAI and/or counter DAI in all time-frequency bundling windows within a certain time period such as one UL burst.

For example, as shown in FIG. 11, the time-frequency bundling windows respectively correspond to first uplink subframes 4, 5, 6 and 7 are all 1, the corresponding downlink subframes are respectively 0, 1, 2 and 3. Thus, the values of the total DAI and counter DAI in the DL assignment in these downlink subframes are determined cumulatively in subframes 0~3. The base station transmits total DAI=3 in subframe 0, transmits total DAI=4 in subframe 1, and transmits total DAI=6 in subframe 3. For facilitating the description, FIG. 11 merely shows the total DAI. It is similar for the counter DAI.

In some embodiments, for the HARQ-ACK feedback in any uplink subframe, the UE determines the number of HARQ-ACK bits and arranges the HARQ-ACK bits according to the number of PDSCHs actually transmitted by the base station, e.g., according to the total DAI and counter DAI.

In some embodiments, when feeding back the HARQ-ACK, the UE feeds back the corresponding HARQ-ACK bits in the first subframe in the feedback window. If the UE does not feed back the HARQ-ACK bits in the first subframe successfully, the UE attempts to feed back the HARQ-ACK bits in the second subframe. At this time, the HARQ-ACK bits include both the HARQ-ACK that the UE fails to feed back in the first subframe and the HARQ-ACK bits corresponding to the second subframe. If the UE successfully feeds back the HARQ-ACK bits in the first subframe, the UE has two manners to feed back the HARQ-ACK bits in the second subframe. In one manner, the UE feeds back in the second subframe both the HARQ-ACK bits corresponding to the first subframe and the HARQ-ACK bits corresponding to the second subframe. In the other manner, the UE feeds back merely the HARQ-ACK bits corresponding to the second subframe. The first manner is able to avoid the impact of incorrect determination about the feedback situation of the first subframe to the receiving of the HARQ-ACK of the second subframe of the base station. The second manner helps to effectively reduce the overhead of the HARQ-ACK feedback.

In one implementation of this embodiment, the UE is able to know from which downlink subframe that the total DAI and the counter DAI transmitted by the base station are counted. For example, the UE may make a determination through obtaining indication information of uplink/downlink burst. Accordingly, it is required that the base station also determines the first subframe for counting the DAI according to the indication information of the uplink/downlink burst when transmitting the total DAI and counter DAI.

In another implementation of this embodiment, the UE may not know from which downlink subframe the total DAI and counter DAI transmitted by the base station are counted. The UE merely needs to arrange the HARQ-ACK bits according to the received total DAI and counter DAI. Accordingly, it is not restricted that the base station must determine the first subframe for counting the DAI according to a certain rule when transmitting the total DAI and counter DAI. The base station may make a determination by itself or according to a predefined rule.

As shown in FIG. 11, suppose that a downlink burst includes subframes 0~3, an uplink burst includes subframes 4~7, and a next downlink burst includes subframes 8~10. UE 1 is configured with 4 CCs, wherein CC0 is a licensed carrier and is a Pcell, CC1~CC3 are unlicensed carriers in the same PUCCH group, CC1 is a pScell for feeding back the HARQ-ACK of CC1~CC3, and belongs to a PUCCH group different from CC0. For facilitating the description, the description is provided merely with respect to CC1~CC3 but not to CC0. As to CC0, the feedback may be performed according to a conventional method. Suppose that the transmission modes of CC1~CC3 are all to support up to 2 transmission blocks. In downlink subframe 0, the base station transmits PDSCH for UE 1 on CC1~CC3. In downlink subframe 1, the base station transmits PDSCH for UE 1 on CC1. In downlink subframe 3, the base station transmits PDSCH for UE 1 on CC1 and CC3. Thus, the base station transmits total DAI=3 in subframe 0, transmits total DAI=4 in subframe 1, and transmits total DAI=6 in subframe 3. The first uplink subframe corresponds to downlink subframe 0 is subframe 4, the feedback window includes subframes 4~7. The first uplink subframe corresponds downlink subframe 1 is subframe 5, and the feedback window includes subframes 5~8. The first uplink subframe corresponds downlink subframe 3 is subframe 7, and the feedback window includes subframes 7~10. However, since the subframes 8~10 are downlink subframes of a new downlink burst, the effective feedback windows respectively include subframes 4~7, subframes 5~7 and subframe 7. Hereinafter, a detailed description is provided with reference to the following situations. It should be noted that the processing is similar for other situations.

If a CCA check performed by UE 1 before uplink subframe 4 succeeds, UE 1 transmits 6 HARQ-ACK bits of downlink subframe 0 in uplink subframe 4.

If a CCA check performed by UE 1 before uplink subframe 4 is failed, but the CCA check in uplink subframe 5 succeeds, UE 1 transmits 6 HARQ-ACK bits of downlink subframe 0 and 2 HARQ-ACK bits of downlink subframe 1 in uplink subframe 5, a total of 8 bits.

If a CCA check performed by UE 1 before uplink subframes 4 and 5 are both failed, but the CCA check in subframe 6 succeeds, UE 1 transmits 6 HARQ-ACK bits of downlink subframe 0 and 2 HARQ-ACK bits of downlink subframe 1 in uplink subframe 6, a total of 8 bits.

If the CCA check performed by UE 1 before uplink subframes 4 and 5 are both failed, but the CCA check in subframe 6 succeeds and the CCA check before uplink subframe 7 succeeds, UE 1 transmits 6 HARQ-ACK bits of downlink subframe 0 and 2 HARQ-ACK bits of downlink subframe 1 in uplink subframe 6, a total of 8 bits. UE 1 transmits in uplink subframe 7 the HARQ-ACK of downlink subframes 2 and 3, a total of 0+4=4 bits. It should be noted that, UE 1 does not detect the DL DCI in downlink subframe 2, UE 1 determines the HARQ-ACK bits corresponding to two PDSCHs to be transmitted in uplink subframe 7 according to the total DAI=6 detected in downlink subframe 3 and the total DAI=4 detected in downlink subframe 2, i.e., 4 HARQ-ACK bits. It is possible that UE 1 also fails to detect the PDSCH in downlink subframe 3. At this time, UE 1 cannot determine whether the miss-detection happens in downlink subframe 2 or downlink subframe 3. But this does not affect the bit length and bit sequence of the HARQ-ACK. It should also be noted that, since UE 1 has transmitted the HARQ-ACK bits of downlink subframes 0 and 1 in uplink subframe 6, UE 1 does not transmit the HARQ-ACK bits of downlink subframes 0 and 1 again when transmitting HARQ-ACK bits in uplink subframe 7.

If the CCA checks performed by UE 1 before uplink subframe 6 are all failed but the CCA check in uplink subframe 7 succeeds, UE 1 transmits in uplink subframe 7, 6 HARQ-ACK bits of downlink subframe 0, 2 HARQ-ACK bits of downlink subframe 1, and 4 HARQ-ACK bits of downlink subframe 3, a total of 12 bits.

It should be noted that, in this embodiment, it is possible to assume that the total DAI and/or counter DAI are counted individually in each PUCCH group. For facilitating the description, this embodiment describes merely one PUCCH group. However, in a practical application, there may multiple PUCCH groups, e.g., one PUCCH group including at least a licensed carrier, and another PUCCH group including merely unlicensed carriers. In this embodiment, the description is provided with respect to the PUCCH group including merely unlicensed carriers. As to the PUCCH group including at least a licensed carrier, the implementation is not restricted in the present disclosure, e.g. uplink control signal may be fed back according to a conventional method, or according to other methods.

The above shows embodiments for determining the number of bits in the FDD-FDD scenario. The embodiments of the present disclosure are also applicable for the TDD-FDD scenario and the idea is the same. Merely the FDD operations need to be mapped to the TDD operations. For example, in the manner 2 of step 703, the number of bits is determined according to the number of PDSCHs actually transmitted by the base station (e.g. total DAI) according to the conventional TDD system. In manner 1 of step 701, as to the HARQ-ACK bits of the PDSCH corresponding to the uplink subframe not successfully transmitted, the number of bits may be determined according to the maximum number of bits can be fed back in the TDD system. In the TDD operations, it is possible that the length of the time-frequency bundling window of one uplink subframe is larger than 1, and it is possible that the lengths of time-frequency bundling windows of different uplink subframes are different. If the manner 2 in step 703 is adopted, when transmitting the total DAI and counter DAI, the base station needs to determine the value of the total DAI and counter DAI according to the number of PDSCHs can be transmitted in all downlink subframes of all time-frequency bundling windows corresponding to the uplink subframes from the first uplink frame to the current uplink subframe in the feedback window. As shown in FIG. 12, downlink subframes 0 and 1 form the HARQ-ACK time-frequency bundling window of uplink subframe 5, the length is 2. Downlink subframe 3 is the HARQ-ACK time-frequency bundling window of uplink subframe 7, the length is 1.

The above describes the situation that the uplink control information includes merely the HARQ-ACK. The present disclosure is also applicable for the situation that the uplink control information includes HARQ-ACK and/CSI.

This embodiment is applicable for transmitting uplink control information on a predefined uplink carrier, e.g. pScell, and pScell is an unlicensed carrier. This embodiment may be combined with embodiment 3, i.e., it is determined according to the method of embodiment 3 that the transmission is implemented on one of the multiple uplink carriers, and it is determined according to this embodiment the transmission is implemented in one of the multiple uplink subframes of the uplink carrier. The sequence for determining the carrier and the subframe is not restricted.

Embodiment 5

This embodiment describes from a base station side, corresponding to embodiment 3.

The present disclosure provides a method for receiving HARQ-ACK information, as shown in FIG. 13. The method includes the following.

In step 1301, a base station determines an uplink subframe n+k responsible for HARQ-ACK feedback of PDSCH(s) of a downlink subframe n.

The base station may determine the above uplink subframe according to the HARQ-ACK feedback timing pre-configured for the UE, or the HARQ-ACK timing dynamically indicated to the UE.

In step 1302, the base station detects, on multiple predefined uplink carriers from a first uplink carrier, uplink control information containing at least HARQ-ACK information, and determines the carrier for receiving the uplink control information.

The predefined uplink carriers may be defined in standards or configured by the base station.

The base station may determine whether the UE transmits the uplink control information containing at least the HARQ-ACK information on a carrier through blind detection, e.g., detecting reference signal, or CRC check, or correlation detection method. Or, the base station may determine whether the UE transmits the uplink control information containing at least the HARQ-ACK information on a corresponding carrier through detecting an indication transmitted by the UE indicating whether the UE has transmitted the corresponding uplink control information. For example, if the UE needs to transmit PUSCH and corresponding uplink control information, but the LBT detection of the UE is failed, the UE may report, e.g., on the Pcell, to the base station that there is no transmission on a corresponding carrier. Therefore, the base station can determine whether the UE has transmitted the uplink control information containing at least the HARQ-ACK information through detecting the information reported by the UE.

In step 1303, the base station determines the length and bit sequence of the uplink control information containing at least the HARQ-ACK information to be received according to information of the carrier carrying the uplink control information containing at least the HARQ-ACK information.

In some embodiments, the base station assumes that the transmitted HARQ-ACK information includes merely the HARQ-ACK information corresponding to the PDSCH(s) of downlink carriers in the PUCCH group corresponding to the first uplink carrier if the UE transmits the HARQ-ACK information on the first uplink carrier, and assumes that the transmitted HARQ-ACK information includes both the HARQ-ACK information of the PDSCH(s) of downlink carriers in the PUCCH group corresponding to the first uplink carrier and the HARQ-ACK information corresponding to the PDSCH(s) of downlink carriers in the PUCCH group of the second uplink carrier if the UE transmits the HARQ-ACK information on the second uplink carrier, and so on.

In some embodiments, the base station assumes that the UE determines the sequence of the HARQ-ACK bits of the PDSCH(s) of the downlink carriers in the PUCCH group of the first uplink carrier and the HARQ-ACK bits of the PDSCH(s) of the downlink carriers in the PUCCH group of the second uplink carrier according to a predefined order. For example, the PUCCH group that the second uplink carrier belongs to include a Pcell, thus the HARQ-ACK bits corresponding to the downlink carriers in this PUCCH group are placed in the front, and the HARQ-ACK bits of the PDSCH(s) of the downlink carriers in the PUCCH group that the first uplink carrier belongs to are placed behind.

In a first manner, the base station assumes that the UE determines the number of HARQ-ACK bits of the PUCCH group whose HARQ-ACK bits are placed in the front according to maximum number of bits can be fed back, i.e., the same as the mechanism in LTE Release 12, in which the number of bits is determined according to number of configured carriers and/or information indicated in UL DAI/DL DAI, but not according to the number of PDSCH(s) actually transmitted by the base station (e.g. total DAI). As to the PUCCH group whose HARQ-ACK bits are placed behind, the number of bits is determined according to the number of PDSCH(s) actually transmitted by the base station (e.g. total DAI).

In a second manner, the base station assumes that if the uplink control information containing the HARQ-ACK is received on the second uplink carrier, the number of HARQ-ACK bits of all PUCCH groups is determined according to the maximum number of bits can be fed back, i.e., the same as the mechanism in LTE Release 12, in which the number of bits is determined according to the number of configured carriers and/or information indicated in UL DAI/DL DAI, but not according to the number of PDSCH(s) actually transmitted by the base station (total DAI). The base station assumes that if the uplink control information containing the HARQ-ACK is received on the first uplink carrier, the number of the HARQ-ACK bits is determined according to the number of PDSCH(s) actually transmitted by the base station (e.g. total DAI).

Embodiment 6

This embodiment describes from the base station side and is corresponding to embodiment 4.

The present disclosure provides a method for receiving HARQ-ACK information, as shown in FIG. 14. The method includes the following.

In step 1401, a base station determines a first uplink subframe n+k for the HARQ-ACK feedback of PDSCH(s) of a downlink subframe n, and determines an uplink control information feedback window starting from the first uplink subframe.

The base station may determine the first uplink subframe and the feedback window according to HARQ-ACK feedback time information and/or feedback window information preconfigured for the UE or according to the HARQ-ACK feedback time information and/or feedback window information dynamically indicated to the UE.

In step 1402, the base station detects uplink control information containing at least HARQ-ACK information in the uplink control information feedback window from the first uplink subframe, and determines the subframe for receiving the uplink control information.

The base station may determine whether the UE transmits the uplink control information containing at least the HARQ-ACK information in a corresponding subframe through blind detection, e.g., detecting reference signal, or CRC check, or correlation detection method. Or, the base station may determine whether the UE transmits the uplink control information containing at least the HARQ-ACK information in a corresponding subframe through detecting an indication transmitted by the UE indicating whether the UE has transmitted the corresponding uplink control information.

In step 1403, the base station determines the bit length and bit sequence of the uplink control information containing at least the HARQ-ACK information needs to be received according to the subframe in which the uplink control information containing at least the HARQ-ACK information is received.

In some embodiments, the base station assumes that the UE arranges the HARQ-ACK bits of the PDSCHs of downlink carriers corresponding to different uplink subframes according to the sequence of the uplink subframes.

In some embodiments, the base station assumes that, if the uplink control information containing at least the HARQ-ACK information is detected in an uplink subframe X1 in the feedback window, the uplink control information detected in a following uplink subframe X2 does not include the HARQ-ACK information transmitted by the UE in the uplink subframe X1.

In a first manner: when transmitting the total DAI and counter DAI, the base station determines the values of the total DAI and/or counter DAI in the downlink subframes of the time-frequency bundling window corresponding to respective uplink subframe X individually. The base station assumes that when the UE feeds back HARQ-ACK bits in uplink subframe X, the HARQ-ACK bits includes the HARQ-ACK bits corresponding to uplink subframes $X_1$, $X_2$, . . . and $X_n$, thus the number of HARQ-ACK bits corresponding to the uplink subframe $X_n$ is determined according to the number of PDSCH(s) actually transmitted (e.g. total DAI), whereas the number of HARQ-ACK bits corresponding to the uplink subframes $X_1$, $X_2$, . . . and $X_{n-1}$ is determined according to the maximum number of bits can be fed back. If the UE successfully transmits the HARQ-ACK bits corresponding to a downlink subframe, the HARQ-ACK bits are not transmitted in the subsequent uplink subframe.

In a second manner: when transmitting the total DAI and counter DAI, the base station determines the values of the total DAI and counter DAI cumulatively in downlink subframes in all time-frequency bundling windows corresponding to all uplink subframes in the uplink control information feedback window. The base station assumes that for the HARQ-ACK fed back in any uplink subframe, the UE determines the length of the HARQ-ACK bits and the sequence the HARQ-ACK bits according to the number of PDSCH(s) actually transmitted by the base station, e.g., according to the total DAI and counter DAI. If the UE successfully transmits the HARQ-ACK bit corresponding to a downlink subframe, the HARQ-ACK bit is not transmitted in subsequent uplink subframes.

It can be seen that, the base station detects the uplink control information in uplink subframe $X_2$ based on a detected result of the uplink control information in uplink subframe $X_1$. For example, the base station needs to determine whether the UE has transmitted uplink control information in uplink subframe $X_1$, so as to determine the length and sequence of the HARQ-ACK bits in the uplink control information in the uplink subframe $X_2$.

For example, in the example as shown in FIG. 11, the downlink burst includes subframes 0~3, the uplink burst includes subframes 4~7, and then follows another downlink burst including subframes 8~10. UE 1 is configured with 4 CCs, wherein CC0 is a licensed carrier and is a Pcell, CC1~CC3 are unlicensed carriers in the same PUCCH group, CC1 is a pScell for feeding back the HARQ-ACK of CC1~CC3, and belongs to a PUCCH group different from CC0. For facilitating the description, the description is provided merely with respect to CC1~CC3 but not to CC0. As to CC0, the feedback may be performed according to a conventional method. Suppose that the transmission modes of CC1~CC3 are all to support up to 2 transmission blocks. In downlink subframe 0, the base station transmits PDSCH for UE 1 on CC1~CC3. In downlink subframe 1, the base station transmits PDSCH for UE 1 on CC1. In downlink subframe 3, the base station transmits PDSCH for UE 1 on CC1 and CC3. Thus, the base station transmits total DAI=3 in subframe 0, transmits total DAI=4 in subframe 1, and transmits total DAI=6 in subframe 3. The first uplink subframe corresponds to downlink subframe 0 is subframe 4, the feedback window includes subframes 4~7. The first uplink subframe corresponds downlink subframe 1 is subframe 5, and the feedback window includes subframes 5~8. The first uplink subframe corresponds downlink subframe 3 is subframe 7, and the feedback window includes subframes 7~10. However, since the subframes 8~10 are downlink subframes of a new downlink burst, the effective feedback windows respectively include subframes 4~7, subframes 5~7 and subframe 7. Hereinafter, a detailed description is provided with reference to the following situations. It should be noted that the processing is similar for other situations.

- The base station detects uplink control information containing HARQ-ACK in uplink subframe 4. The base station assumes that the HARQ-ACK of downlink subframe 0 is expected to be received in uplink subframe 4, which includes 6 bits.
- If the base station does not detect the uplink control information containing the HARQ-ACK in uplink subframe 4, the base station detects uplink control information containing HARQ-ACK in uplink subframe 5. The base station assumes that 6 HARQ-ACK bits of downlink subframe 0 and 2 HARQ-ACK bits of downlink subframe 1 are expected to be received in uplink subframe 5, a total of 8 bits.
- If the base station does not detect the uplink control information containing HARQ-ACK in uplink subframes 4 and 5, the base station detects uplink control information containing HARQ-ACK in uplink subframe 6. The base station assumes that the 6 HARQ-ACK bits of downlink subframe 0 and 2 HARQ-ACK bits of downlink subframe 1 are expected to be received in uplink subframe 6, a total of 8 bits.
- If the base station does not detect the uplink control information containing HARQ-ACK in uplink subframes 4 and 5, the base station detects in uplink subframe 6, and expects to receive 6 HARQ-ACK bits of downlink subframe 0 and 2 HARQ-ACK bits of downlink subframe 1, a total of 8 bits. If the detection succeeds, the base station detects in uplink subframe 7, and expects to receive the HARQ-ACK of downlink subframes 2 and 3, a total of 0+4=4 bits.

If the base station does not detect the uplink control information containing the HARQ-ACK before uplink subframe 7, the base station detects in uplink subframe 7. The base station expects to receive 6 HARQ-ACK bits of downlink subframe 0, 2 HARQ-ACK bits of downlink subframe 1 and 4 HARQ-ACK bits of downlink subframe 3 in the uplink subframe 7, a total of 12 bits.

In some embodiments, the base station assumes that, no matter whether the uplink control information containing the HARQ-ACK information is detected in an uplink subframe $X_1$ in the feedback window, the uplink control information detected in a following uplink subframe $X_2$ still includes the HARQ-ACK information transmitted by the UE in the uplink subframe $X_1$. In other words, in the example as shown in FIG. 11, no matter whether the base station detects the HARQ-ACK information in uplink subframe 4, the base station assumes that, if the detection in subframe 5 succeeds, the number of HARQ-ACK bits is 8. If the detection in subframe 6 succeeds, the number of HARQ-ACK bits is 8. If the detection in subframe 7 succeeds, the number of HARQ-ACK bits is 12.

Embodiment 7

The present disclosure provides a method for feeding back HARQ-ACK information. As shown in FIG. 16, the method includes the following.

In step 1601, a UE determines a first uplink subframe n+k for HARQ-ACK feedback of PDSCH(s) of a downlink subframe n, and determines an uplink control information feedback window starting from the first uplink subframe.

In some embodiments, the length of the feedback window is configured by an eNB.

In some embodiments, the length of the feedback window is defined by a system.

In some embodiments, the length N of the feedback window is an integer larger than 1.

In step 1602, the UE determines, in the uplink control information feedback window, a position of a subframe available for transmitting uplink control information containing at least HARQ-ACK, and determines an uplink carrier for transmitting the uplink control information in the subframe.

In step 1603, the UE determines HARQ-ACK bits to be transmitted according to the position of the subframe and the uplink carrier for transmitting the uplink control information containing at least the HARQ-ACK, and transmits the uplink control information containing at least the HARQ-ACK on the uplink carrier in the subframe.

In step 1602, the process that the UE determines the uplink carrier available for transmitting the uplink control information according to the position of the subframe for transmitting the uplink control information containing at least the HARQ-ACK includes: in the first uplink subframe of the uplink control information feedback window, a first uplink carrier is an uplink carrier determined according to a predefined criteria, e.g., the first uplink carrier is an uplink carrier with a minimum Scellindex among those scheduled to transmit PUSCH in the uplink subframe, and/or an uplink carrier indicated by higher layer signaling/physical layer signaling. If the UE cannot transmit on the uplink carrier, e.g., the LBT detection is failed, the UE attempts to transmit the uplink control information in a second uplink subframe in the uplink control information feedback window. A second uplink carrier selected by the UE has a predefined relationship with the first uplink carrier in the first uplink subframe. For example, the uplink carrier transmitting the uplink control information in the second uplink subframe is an uplink carrier with a second minimum Scellindex among those actually being scheduled to transmit PUSCH in the second uplink subframe. It should be noted that, besides the uplink control information whose transmission is delayed (e.g. the uplink control information should have been transmitted in the first uplink subframe), the second uplink subframe may further carry the uplink control information whose transmission is not delayed (e.g., the uplink control information should be transmitted in the second uplink subframe). The uplink control information whose transmission is not delayed is still transmitted on the uplink carrier with the minimum Scellindex among those scheduled to transmit PUSCH in the second uplink subframe. It can be seen that, the delayed and non-delayed uplink control information are transmitted on different uplink carriers, which avoids the impact to the non-delayed uplink control information brought out by the delayed uplink control information, e.g. the impact to the HARQ-ACK code book. The process proceeds similarly till the end of the uplink control information feedback window.

As shown in FIG. 17, the eNB configures 1 licensed carrier CC0 and 2 unlicensed carriers CC1 and CC2 for the UE. The HARQ-ACK feedback for CC0 may be implemented according to a conventional method. FIG. 17 merely shows the implementation for CC1 and CC2. The first uplink subframe corresponding to downlink subframe 0 is uplink subframe 4, the first uplink carrier is CC1, the second uplink subframe is uplink subframe 5, and the second uplink carrier is CC2. The first uplink subframe corresponding to downlink subframe 1 is uplink subframe 5, and the first uplink carrier is CC1. If the UE finishes LBT detection on CC1 before uplink subframe 4, the UE feeds back the HARQ-ACK of downlink carriers CC1 and CC2 of downlink subframe 0 in uplink subframe 4, and feeds back the HARQ-ACK of downlink carriers CC1 and CC2 of downlink subframe 1 in uplink subframe 5. If the UE does not finish the LBT detection on uplink carrier CC1 before uplink subframe 4, finishes the LBT on CC1 before uplink subframe 5 but does not finish the LBT on CC2, the UE feeds back the HARQ-ACK of downlink carriers CC1 and CC2 of downlink subframe 1 in uplink subframe 5 on uplink carrier 1, and gives up the HARQ-ACK of downlink carriers CC1 and CC2 of downlink subframe 0. If the UE does not finish the LBT on CC1 before uplink subframe 4, but finishes the LBT on CC1 and the LBT on CC2 before uplink subframe 5, the UE feeds back the HARQ-ACK of downlink carriers CC1 and CC2 of downlink subframe 1 in uplink subframe 5 on CC1, and feeds back the HARQ-ACK of downlink carriers CC1 and CC2 of downlink subframe 0 in subframe 5 on CC2. If the UE does not finish the LBT on CC1 before uplink subframe 4, and does not finish the LBT on CC1 before uplink subframe 5, but finishes the LBT on CC2 before uplink subframe 5, the UE feeds back the HARQ-ACK of downlink carriers CC1 and CC2 of downlink subframe 0 in uplink subframe 5 on CC2, and gives up the HARQ-ACK of downlink carriers CC1 and CC2 of downlink subframe 1. If the UE does not finish the LBT on CC1 and CC2 in subframes 5 and 6, the UE gives up all HARQ-ACK feedback.

Embodiment 8

The present disclosure provides a method for feeding back HARQ-ACK information. As shown in FIG. 18, the method includes the following.

In step 1801, a UE determines an uplink subframe n+k for HARQ-ACK feedback of PDSCH(s) in a downlink subframe n, and determines whether periodic CSI needs to be fed back in uplink subframe n+k.

In step 1802, the UE feeds back in the uplink subframe n+k, a first type ACK/NACK on a first uplink carrier and/or a second type ACK/NACK on a second uplink carrier, and/or the periodic CSI on a third uplink carrier.

In some embodiments, the first type ACK/NACK includes the ACK/NACK of some or all carriers in a first type PUCCH group, the some or all carriers do not belong to a second type PUCCH group. The second type ACK/NACK includes ACK/NACK of carriers in the second type PUCCH group.

In some embodiments, the first type ACK/NACK includes at least ACK/NACK of a licensed carrier. The second type ACK/NACK includes ACK/NACK of unlicensed carriers.

In some embodiments, the first uplink carrier is a licensed carrier in the first type PUCCH group. If the UE support simultaneous transmission of the PUCCH and PUSCH, the first uplink carrier is an uplink carrier available for transmitting the PUCCH in the first type PUCCH group, e.g.

Pcell and/or pScell defined in existing standards, generally a licensed carrier. If the UE does not support simultaneous transmission of PUCCH and PUSCH, the first uplink carrier is an uplink carrier available for transmitting PUCCH in the first type PUCCH group or a licensed carrier in the first type PUCCH group.

In some embodiments, the second uplink carrier is a licensed carrier and/or an unlicensed carrier in the second type PUCCH group.

In some embodiments, the third uplink carrier is a licensed carrier.

In some embodiments, the third uplink carrier is a licensed carrier in the first type PUCCH group.

In some embodiments, the third uplink carrier is a licensed carrier corresponding to the second type PUCCH group configured by the base station. The licensed carrier may not belong to the second PUCCH group.

In some embodiments, the UE may feed back the period CSI on the third uplink carrier according to any one or any combination of the following manners.

Manner 1: if the UE is configured to be able to transmit PUCCH and PUSCH simultaneously, and the UE is scheduled to transmit PUSCH on at least one licensed carrier in subframe n+k, and there is no first type ACK/NACK needs to be fed back on the first uplink carrier, the UE feeds back the periodic CSI on the PUCCH of the third uplink carrier Pcell and/or pScell. Additionally or alternatively, if the UE is configured to be able to transmit PUCCH and PUSCH simultaneously, and the UE is scheduled to transmit PUSCH on at least one licensed carrier in subframe n+k, and it is required to feed back first type ACK/NACK on the first uplink carrier, the UE feeds back the first type ACK/NACK on the PUCCH of the first uplink carrier Pcell/pScell, selects a carrier from the at least one licensed carrier scheduled for transmitting the PUSCH as the third uplink carrier, and transmits the periodic CSI on the PUSCH of the third uplink carrier (it should be noted that, the first uplink carrier and the third uplink carrier may be the same uplink carrier, or different uplink carriers, but both of them are licensed carriers). Additionally or alternatively, if the UE is configured to be able to transmit PUCCH and PUSCH simultaneously, the UE is merely scheduled to transmit PUSCH on at least one unlicensed carrier in subframe n+k, but is not scheduled to transmit PUSCH on licensed carrier, the UE feeds back the periodic CSI and/or the first type ACK/NACK on the PUCCH of the third uplink carrier Pcell and/or pScell. At this time, the first uplink carrier and the third uplink carrier are the same carrier. In this manner, the transmission of the PUSCH on the unlicensed carrier is generally not affected by the transmission on the licensed carrier.

Manner 2: if the UE is not configured to be able to transmit PUCCH and PUSCH simultaneously, and the UE is scheduled to transmit PUSCH on at least one licensed carrier in subframe n+k, the UE selects a carrier from those scheduled to transmit the PUSCH according to a predefined rule as the third uplink carrier, and feeds back the periodic CSI and/or the first type ACK/NACK on the PUSCH of the third uplink carrier. At this time, the first uplink carrier and the third uplink carrier are the same carrier. Additionally or alternatively, if the UE is not configured to be able to transmit PUCCH and PUSCH simultaneously, and the UE is scheduled to transmit the PUSCH on merely at least one unlicensed carrier in subframe n+k, but is not scheduled to transmit the PUSCH on the licensed carrier, the UE feeds back the periodic CSI and/or the first type ACK/NACK and/or the second type ACK/NACK on the PUCCH of the third uplink carrier Pcell and/or pScell, and does not transmit the PUSCH on the unlicensed carrier. At this time, the first uplink carrier and the third uplink carrier are the same carrier. In this manner, the transmission of the PUSCH on the unlicensed carrier is generally affected by the transmission of the PUCCH on the licensed carrier, i.e., if PUCCH is transmitted on the licensed carrier, the PUSCH cannot be transmitted on the unlicensed carrier.

It should be noted that, the second type ACK/NACK is generally transmitted on merely the second uplink carrier. For example, if the second type PUCCH group includes at least one uplink carrier transmitting PUCCH, the second type ACK/NACK is transmitted on the second uplink carrier. Merely in some special cases, the transmission is on the first uplink carrier. The fallback condition has been described in other embodiments of the present disclosure and is not repeated herein.

Suppose that the eNB configures 5 carriers for the UE, wherein CC1 and CC2 are licensed carriers, CC3~CC5 are unlicensed carrier. CC1 is a Pcell, CC1~CC5 belong to the same first type PUCCH group. The PUCCH may be transmitted on CC1. CC3~CC5 belong to the same second type PUCCH group. The ACK/NACK of CC1 and CC2 can only be transmitted on the PUCCH of CC1 or the PUSCH of CC1/CC2. In most cases, the ACK/NACK of CC3~CC5 is not transmitted on CC1/CC2. For example, if there is PUSCH transmission on at least one of CC3~CC5, the ACK/NACK is transmitted on the at least one PUSCH on CC3~CC5. But in some special cases, the ACK/NACK of CC3~CC5 may be transmitted on CC1/CC2, e.g., when there is no PUSCH transmission on any one of CC3~CC5. As to the periodic CSI, the periodic CSI of any one of CC1~CC5 cannot be transmitted on CC3~CC5, i.e., can only be transmitted on CC1/CC2.

As shown in FIG. 19, the eNB schedules the UE in subframe n to transmit PUSCH on the CC2, CC3 and CC5 in subframe n+4. In subframe n+4, the UE needs to feed back the ACK/NACK of CC1~CC5 and the periodic CSI of CC3. Suppose that the UE is configured to be able to transmit PUCCH and PUSCH simultaneously. Thus, in subframe n+4, the UE feeds back the ACK/NACK of CC1 and CC2 on the PUCCH on CC1, transmits PUSCH on CC2, and feeds back the periodic CSI of CC3 on the PUSCH on CC2. The UE performs LBT detection on CC3 and CC5, transmits PUSCH on the CC on which the LBT detection succeeds, and feeds back the ACK/NACK of CC3~CC5 on the PUSCH on one or more CCs on which the LBT detection succeeds according to a predefined rule. The predefined rule may be configured according to method described in other embodiments of the present disclosure or according to a conventional method.

For another example, as shown in FIG. 20, the eNB schedules in subframe n the UE to transmit PUSCH in subframe n+4 on CC3 and CC5. In subframe n+4, the UE needs to feed back the ACK/NACK of CC1~CC5 and the periodic CSI of CC3. Suppose that the UE is configured to be able to transmit PUCCH and PUSCH simultaneously. Thus, in subframe n+4, the UE feeds back the ACK/NACK of CC1 and CC2 on the PUCCH of CC1, and feeds back the periodic CSI of CC3 on the PUCCH of CC1. The UE performs an LBT detection on CC3 and CC5, transmits PUSCH on the CC on which the LBT detection succeeds, and transmits the ACK/NACK of CC3~CC5 on the PUSCH of one or more CCs on which the LBT detection succeeds according to a predefined rule. It can be seen that, in order to ensure that the periodic CSI (whether the periodic CSI of the licensed carrier or the periodic CSI of the unlicensed carrier) is not transmitted on the unlicensed carrier, if there is at least one licensed carrier in the same first type PUCCH group transmitting PUSCH, the periodic CSI can be transmitted on the PUSCH of the at least one licensed carrier. If there is no licensed carrier transmitting PUSCH in the same first type PUCCH group, the periodic CSI can only be transmitted on the PUSCH of the Pcell or pScell, but not transmitted on the PUSCH of the unlicensed carrier. As to the selection of the PUSCH of the licensed carrier for transmitting the periodic CSI, the PUSCH of a carrier with a minimum Scellindex among those transmitting PUSCH may be selected.

Manner 3: if the UE successfully transmits PUSCH and HARQ-ACK on one uplink carrier of the second type PUCCH group in subframe n+k, and the UE needs to transmit the periodic CSI of downlink carriers of the second type PUCCH group, the UE transmits the periodic CSI on a licensed carrier (the third uplink carrier) corresponding to the second type PUCCH group configured by the base station. The third uplink carrier may carry the periodic CSI by the PUCCH or PUSCH. In some embodiments, the transmission of the periodic CSI of the downlink carriers corresponding to the third uplink carrier may be performed according to a conventional method, i.e., transmitting on a licensed carrier, e.g. the Pcell/pScell of the first type PUCCH group.

Embodiment 9

This embodiment provides a method for transmitting uplink control information on an unlicensed carrier, including the following.

In step 2101, a UE receives a UL grant scheduling a PUSCH on an unlicensed carrier.

In step 2102, the UE determines whether the UL grant received in step 2101 is used for scheduling the UE to transmit PUSCH carrying uplink data, or used for scheduling the UE to transmit PUSCH carrying merely uplink control signaling.

In some embodiments, if the UL grant is DCI scheduling one transmission block (TB), the UL grant indicates Imcs=29, the resource allocation indicates that a group of interlace PRBs are scheduled, and a CSI request indicates a aperiodic CSI reporting, the UE determines that the PUSCH scheduled by the base station does not carry uplink data (no TB for UL-SCH), the UE reports merely uplink control information.

In some embodiments, if the UL grant is DCI scheduling multiple TBs, the UL grant indicates that Imcs=29, merely one TB is scheduled and merely one data stream is scheduled, the resource allocation indicates that the one interlace PRB is scheduled, and the CSI request indicates aperiodic CSI reporting of one carrier or one CSI process, the UE determines that the PUSCH scheduled by the base station does not carry uplink data (no TB for UL-SCH), the UE reports merely uplink control information.

In some embodiments, one interlace includes a group of PRBs with equal intervals in the frequency domain. For example, on a 20 MHz system bandwidth, 10 PRBs with equal intervals form a group, which corresponds to one interlace.

In step 2103, the UE transmits uplink data or merely transmits uplink control signaling according to a transmission mode of the PUSCH determined according to the UL grant.

In accordance with the above method, embodiments of the present disclosure provide an apparatus. As shown in FIG. 15, the apparatus includes a receiving module and a feedback module; wherein the receiving module is configured to receive a DL-GRANT scheduling downlink HARQ transmission in a time-frequency bundling window corresponding to an uplink subframe responsible for HARQ-ACK feedback and/or time-frequency bundling windows corresponding to all uplink subframes in a feedback window of uplink subframes responsible for HARQ-ACK feedback, obtain a DL DAI and/or a total DAI and/or a counter DAI in the DL-GRANT, and determine a mapping value of each DAI; and the feedback module is configured to map HARQ-ACK bits of each HARQ feedback unit to corresponding bits of a feedback bit sequence according to the mapping value of the corresponding DAI.

Those with ordinary skill in the art would know that all or some steps in the method provided by the embodiments of the present disclosure may be implemented by a program executed by relevant hardware. The program may be stored in a computer readable storage medium. When the program is executed, one or a combination of the steps in the above method is implemented.

In addition, the functional modules in the embodiments of the present disclosure may be integrated into one processing module, or may be independent from each other. Or, two or more of the above modules may be integrated in one module. The integrated module may be implemented in form of hardware of software functional module. If the integrated module is implemented via software functional module and is sold or used as an independent product, the integrated module may be stored in a computer readable storage medium.

The above storage medium may be read only memory, disk, or compact disk, etc.

The foregoing are only preferred embodiments of the present disclosure and are not for use in limiting the protection scope of the present invention. Any modification, equivalent replacement and improvement made within the scope of the present disclosure should be covered under the protection scope of the present invention.

The invention claimed is:

1. A method performed by a terminal in a wireless communication system, the method comprising:
receiving, from a base station, a physical downlink control channel (PDCCH) scheduling downlink transmission in a time-frequency bundling window, wherein the downlink transmission includes at least one of a physical downlink shared channel (PDSCH) or a PDCCH indicating release of semi-persistent scheduling, and the downlink transmission corresponds to a first uplink subframe in a feedback window for transmitting hybrid automatic repeat request acknowledgement (HARQ-ACK);
obtaining a downlink assignment index (DAI) for each of downlink subframes in the time-frequency bundling window based on the PDCCH;
identifying an uplink carrier for transmitting the HARQ-ACK;
in case that the first uplink subframe is identified as not available for transmitting the HARQ-ACK, identifying a second uplink subframe which is available for transmitting the HARQ-ACK, wherein the second uplink subframe is within the feedback window and is later than the first uplink subframe;
mapping HARQ-ACK bits for the first uplink subframe and the second uplink subframe to corresponding bits of a feedback bit sequence based on the obtained DAI; and
transmitting, to the base station, the feedback bit sequence on the uplink carrier in the second uplink subframe.

2. The method of claim 1, wherein the uplink carrier includes a first uplink carrier and a second uplink carrier, wherein mapping the HARQ-ACK bits comprises:
mapping HARQ bits for the first uplink subframe to a first feedback bit sequence; and
mapping HARQ bits for the second uplink subframe to a second feedback bit sequence, and
wherein transmitting the feedback bit sequence comprises:
transmitting, to the base station, the first feedback bit sequence on the second uplink carrier in the second uplink subframe; and
transmitting, to the base station, the second feedback bit sequence on the first uplink carrier in the second uplink subframe.

3. The method of claim 2, wherein the first uplink carrier is an unlicensed carrier and the second uplink carrier is a licensed carrier, and
wherein the transmitting the feedback bit sequence further comprises:
transmitting, to the base station, a periodic channel state information (CSI) on the second uplink carrier in the second uplink subframe, in case that the periodic CSI is required to be transmitted in the second uplink subframe.

4. The method of claim 1, wherein the feedback window of the first uplink subframe for transmitting the HARQ-ACK starts from the first uplink subframe, and the length of the feedback window is configurable.

5. The method of claim 1, wherein the time-frequency bundling window comprises the downlink subframes whose HARQ-ACKs need to be transmitted in the first uplink subframe, and HARQ-ACK bits for the downlink subframes are arranged to based on a predefined rule, and
wherein the feedback bit sequence includes first HARQ-ACK bits for the first uplink subframe and second HARQ-ACK bits for the second uplink subframe.

6. A terminal for transmitting hybrid automatic repeat request acknowledgement (HARQ-ACK) information, in a wireless communication system, the terminal comprising:
a transceiver configured to transmit and receive a signal; and
a controller coupled with the transceiver and configured to:
receive, from a base station, a physical downlink control channel (PDCCH) scheduling downlink transmission in a time-frequency bundling window, wherein the downlink transmission includes at least one of a physical downlink shared channel (PDSCH) or a PDCCH indicating release of semi-persistent scheduling, and the downlink transmission corresponds to a first uplink subframe in a feedback window for transmitting hybrid automatic repeat request acknowledgement (HARQ-ACK),
obtain a downlink assignment index (DAI) for each of downlink subframes in the time-frequency bundling window based on the PDCCH,
identify an uplink carrier for transmitting the HARQ-ACK,
in case that the first uplink subframe is identified as not available for transmitting the HARQ-ACK, identify a second uplink subframe which is available for transmitting the HARQ-ACK, wherein the second uplink subframe is within the feedback window and is later than the first uplink subframe;

map HARQ-ACK bits for the first uplink subframe and the second uplink subframe to corresponding bits of a feedback bit sequence based on the obtained DAI, and transmit, to the base station, the feedback bit sequence on the uplink carrier in the second uplink subframe.

7. The terminal of claim 6, wherein the uplink carrier includes a first uplink carrier and a second uplink carrier, and in case that the first uplink carrier is not available in the first uplink subframe and the first uplink carrier and the second uplink carrier are available in the second uplink subframe, the controller is further configured to:

map HARQ bits for the first uplink subframe to a first feedback bit sequence, map HARQ bits for the second uplink subframe to a second feedback bit sequence, transmit, to the base station, the first feedback bit sequence on the second uplink carrier in the second uplink subframe, and transmit, to the base station, the second feedback bit sequence on the first uplink carrier in the second uplink subframe.

8. The terminal of claim 7, wherein the first uplink carrier is an unlicensed carrier in and the second uplink carrier is a licensed carrier, and wherein the controller is further configured to transmit, to the base station, a periodic channel state information (CSI) on the second uplink carrier in the second uplink subframe, in case that the periodic CSI is required to be transmitted in the second uplink subframe.

9. The terminal of claim 6, wherein the feedback window of the first uplink subframe for transmitting the HARQ-ACK starts from the first uplink subframe, and the length of the feedback window is configurable.

10. The terminal of claim 6, wherein the time-frequency bundling window comprises the downlink subframes whose HARQ-ACKs need to be transmitted in the first uplink subframe, and HARQ-ACK bits for the downlink subframes are arranged based on a predefined rule, and wherein the feedback bit sequence includes a first HARQ-ACK bits for the first uplink subframe and a second HARQ-ACK bits for the second uplink subframe.

11. A method performed by a base station in a wireless communication system, the method comprising:

transmitting, to a terminal, a physical downlink control channel (PDCCH) scheduling downlink transmission in a time-frequency bundling window, wherein the downlink transmission includes at least one of a physical downlink shared channel (PDSCH) or a PDCCH indicating release of semi-persistent scheduling, and the downlink transmission corresponds to a first uplink subframe in a feedback window for receiving hybrid automatic repeat request acknowledgement (HARQ-ACK);

receiving, from the terminal, a feedback bit sequence on an uplink carrier for receiving the HARQ-ACK in a second uplink subframe, wherein the uplink carrier is identified by the terminal based on the PDCCH, wherein the second uplink subframe, which is available for transmitting the HARQ-ACK is identified by the terminal, in case that the first uplink subframe is identified as not available for transmitting the HARQ-ACK by the terminal, wherein the second uplink subframe is within the feedback window and is later than the first uplink subframe, wherein a downlink assignment index (DAI) for each of downlink subframes in the time-frequency bundling window is obtained by the terminal based on the PDCCH, and wherein HARQ-ACK bits for the first uplink subframe and the second uplink subframe are mapped to corresponding bits of the feedback bit sequence based on the obtained DAI.

12. The method of claim 11, wherein the uplink carrier includes a first uplink carrier and a second uplink carrier, and in case that the first uplink carrier is not available in the first uplink subframe and the first uplink carrier and the second uplink carrier are available in the second uplink subframe, HARQ bits for the first uplink subframe are mapped to a first feedback bit sequence and HARQ bits for the second uplink subframe are mapped to a second feedback bit sequence, and wherein the receiving the feedback bit sequence comprises:

receiving, from the terminal, the first feedback bit sequence on the second uplink carrier in the second uplink subframe; and receiving, from the terminal, the second feedback bit sequence on the first uplink carrier in the second uplink subframe.

13. The method of claim 12, wherein the first uplink carrier is an unlicensed carrier in and the second uplink carrier is a licensed carrier, and wherein receiving the feedback bit sequence comprises receiving, from the terminal, a periodic channel state information (CSI) on the second uplink carrier in the second uplink subframe, in case that the periodic CSI is required to be received in the second uplink subframe.

14. The method of claim 11, wherein the feedback window of the first uplink subframe for receiving the HARQ-ACK starts from the first uplink subframe, and the length of the feedback window is configurable.

15. The method of claim 11, wherein the time-frequency bundling window comprises the downlink subframes whose HARQ-ACKs need to be received in the first uplink subframe, and HARQ-ACK bits for the downlink subframes are arranged based on a predefined rule, and wherein the feedback bit sequence includes a first HARQ-ACK bits for the first uplink subframe and a second HARQ-ACK bits for the second uplink subframe.

16. A base station for receiving hybrid automatic repeat request acknowledgement (HARQ-ACK) information in a wireless communication system, the base station comprising:

a transceiver configured to transmit and receive a signal; and a controller coupled with the transceiver and configured to:

transmit, to a terminal, a physical downlink control channel (PDCCH) scheduling downlink transmission in a time-frequency bundling window, wherein the downlink transmission includes at least one of a physical downlink shared channel (PDSCH) or a PDCCH indicating release of semi-persistent scheduling, and the downlink transmission corresponds to a first uplink subframe in a feedback window for receiving hybrid automatic repeat request acknowledgement (HARQ-ACK), receive, from the terminal, a feedback bit sequence on an uplink carrier for receiving the HARQ-ACK in a second uplink subframe, wherein the uplink carrier is identified by the terminal based on the PDCCH, wherein the second uplink subframe which is available for transmitting the HARQ-ACK is identified by the terminal, in case that the first uplink subframe is identified as not available for transmitting the HARQ-ACK by the terminal, wherein the second uplink subframe is within the feedback window and is later than the first uplink subframe, wherein a downlink assignment index (DAI) for each of downlink subframes in the time-frequency bundling window is obtained by the terminal based on the PDCCH, and wherein HARQ-ACK bits for the first uplink subframe and the second uplink subframe are mapped to corresponding bits of the feedback bit sequence based on the obtained DAI.

17. The base station of claim 16, wherein the uplink carrier includes a first uplink carrier and a second uplink carrier, and in case that the first uplink carrier is not available in the first uplink subframe and the first uplink carrier and the second uplink carrier are available in the second uplink subframe, HARQ bits for the first uplink subframe are mapped to a first feedback bit sequence and HARQ bits for the second uplink subframe are mapped to a second feedback bit sequence, and the controller is further configured to:

receive, from the terminal, the first feedback bit sequence on the second uplink carrier in the second uplink subframe, and receive, from the terminal, the second feedback bit sequence on the first uplink carrier in the second uplink subframe.

18. The base station of claim 17, wherein the first uplink carrier is an unlicensed carrier and the second uplink carrier is a licensed carrier, and wherein the controller is further configured to receive, from the terminal, a periodic channel state information (CSI) on the second uplink carrier in the second uplink subframe, in case that the periodic CSI is required to be received in the second uplink subframe.

19. The base station of claim 16, wherein the feedback window of the first uplink subframe for receiving the HARQ-ACK starts from the first uplink subframe, and the length of the feedback window is configurable.

20. The base station of claim 16, wherein the time-frequency bundling window comprises the downlink subframes whose HARQ-ACKs need to be received in the first uplink subframe, and HARQ-ACK bits for the downlink subframes are arranged based on a predefined rule, and wherein the feedback bit sequence includes a first HARQ-ACK bits for the first uplink subframe and a second HARQ-ACK bits for the second uplink subframe.

* * * * *